(12) United States Patent
Zhang et al.

(10) Patent No.: US 12,416,891 B2
(45) Date of Patent: Sep. 16, 2025

(54) CONSUMABLES CHIP, CONSUMABLE, IMAGE-FORMING APPARATUS, COMMUNICATION METHOD, AND DETECTION METHOD

(71) Applicant: Zhuhai Pantum Electronics Co., Ltd., Zhuhai (CN)

(72) Inventors: Hao Zhang, Zhuhai (CN); Haixiong Li, Zhuhai (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 82 days.

(21) Appl. No.: 18/147,675

(22) Filed: Dec. 28, 2022

(65) Prior Publication Data

US 2023/0213884 A1  Jul. 6, 2023

(30) Foreign Application Priority Data

Dec. 31, 2021 (CN) .......................... 202111681851.3
Aug. 22, 2022 (CN) .......................... 202211004622.2

(51) Int. Cl.
*G03G 15/00* (2006.01)
*G03G 15/08* (2006.01)
(Continued)

(52) U.S. Cl.
CPC ......... *G03G 15/80* (2013.01); *G03G 15/0863* (2013.01); *G03G 21/1652* (2013.01);
(Continued)

(58) Field of Classification Search
CPC ............... G03G 15/0863; G03G 15/80; G03G 21/1652; G03G 21/1867; G03G 21/1875;
(Continued)

(56) References Cited

U.S. PATENT DOCUMENTS

2005/0105721 A1* 5/2005 Ono .................. G03G 21/1892
380/51

FOREIGN PATENT DOCUMENTS

CN         2888501 Y    4/2007
CN       101045394 A   10/2007
(Continued)

*Primary Examiner* — Joseph S Wong
(74) *Attorney, Agent, or Firm* — ANOVA LAW GROUP PLLC

(57) ABSTRACT

The present disclosure provides a consumable chip, a consumable, an image-forming apparatus, a communication method, and a detection method. The consumable chip includes the first connection terminal, configured to be connected to the first connection pin when the consumable is installed on the image-forming apparatus; the second connection terminal, configured to be connected to the second connection pin when the consumable is installed on the image-forming apparatus; the power supply circuit, configured to convert the first input signal and the second input signal received through the first connection terminal and the second connection terminal into a DC voltage to supply power to the microcontroller; the demodulation circuit, configured to demodulate the first input signal and the second input signal to obtain demodulated signals; and the modulation circuit, configured to send modulation signals to the image-forming control unit through the first connection terminal and the second connection terminal.

20 Claims, 13 Drawing Sheets

(51) Int. Cl.
*G03G 21/16* (2006.01)
*G03G 21/18* (2006.01)

(52) U.S. Cl.
CPC ..... *G03G 21/1867* (2013.01); *G03G 21/1875* (2013.01); *G03G 21/1878* (2013.01); *G03G 21/1882* (2013.01); *G03G 21/1892* (2013.01)

(58) Field of Classification Search
CPC ........... G03G 21/1878; G03G 21/1882; G03G 21/1892
See application file for complete search history.

(56) References Cited

FOREIGN PATENT DOCUMENTS

| | | | |
|---|---|---|---|
| CN | 201145830 | Y | 11/2008 |
| CN | 101609297 | A | 12/2009 |
| CN | 201607615 | U | 10/2010 |
| CN | 102173206 | A | 9/2011 |
| CN | 101995808 | B | 7/2012 |
| CN | 109613809 | A | 4/2019 |
| CN | 110134046 | A | 8/2019 |
| CN | 111591040 | A | 8/2020 |
| CN | 108267943 | B | 8/2021 |
| JP | H10198236 | A | 7/1998 |
| JP | 2005215599 | A | 8/2005 |
| WO | 2014201949 | A1 | 12/2014 |
| WO | 2018227914 | A1 | 12/2018 |

\* cited by examiner

CONSUMABLES CHIP, CONSUMABLE, IMAGE-FORMING APPARATUS, COMMUNICATION METHOD, AND DETECTION METHOD

CROSS-REFERENCE TO RELATED APPLICATION

This application claims the priority to Chinese patent application No. 202111681851.3, filed on Dec. 31, 2021, and No. 202211004622.2, filed on Aug. 22, 2022, in the China National Intellectual Property Administration, the entirety of which is incorporated herein by its reference.

TECHNICAL FIELD

The present disclosure generally relates to the field of image-forming technology and, more particularly, relates to a consumable chip, a consumable, an image-forming apparatus, a communication method, and a detection method.

BACKGROUND

With development of image-forming technology, image-forming apparatuses such as laser printing apparatuses and ink jet printing apparatuses have been widely used. A consumable chip is normally installed on the image-forming apparatus. During the image-forming process, an image-forming control unit in the image-forming apparatus needs to communicate with the consumable chip. For example, the image-forming control unit needs to obtain image-forming auxiliary information in the consumable chip to complete the image-forming process. The image-forming auxiliary information is configured for identification of the consumable chip, recording material usage status and the like.

In the existing technology, the image-forming control unit normally communicates with the consumable chip through a 4-wire I2C interface. Therefore, 4 electrical contact points (corresponding to 4 wires of the I2C interface) need to be configured on the consumable chip, and the quantity of the electrical contact points on the consumable chip may be relatively large.

SUMMARY

One aspect of the present disclosure provides a consumable chip. The consumable chip is capable of being installed on a consumable; the consumable is capable of being detachably installed on an image-forming apparatus; the image-forming apparatus includes an image-forming control unit; and the image-forming apparatus is disposed with a power supply pin, a ground pin, and a first connection pin and a second connection pin which are different from the power supply pin and the ground pin. The consumable chip includes a substrate, where the substrate is disposed with a first connection terminal, a second connection terminal, and an electronic module electrically connected to the first connection terminal and the second connection terminal; and the electronic module includes a power supply circuit, a demodulation circuit, a modulation circuit, and a microcontroller. The first connection terminal is configured to be connected to the first connection pin when the consumable is installed on the image-forming apparatus; the second connection terminal is configured to be connected to the second connection pin when the consumable is installed on the image-forming apparatus; the power supply circuit is configured to convert a first input signal and a second input signal received through the first connection terminal and the second connection terminal into a DC (direct current) voltage to supply power to the microcontroller; the demodulation circuit is configured to demodulate the first input signal and the second input signal to obtain demodulated signals; and the modulation circuit is configured to send modulation signals to the image-forming control unit through the first connection terminal and the second connection terminal.

Another aspect of the present disclosure provides a consumable. The consumable includes a housing; a developer accommodating portion in the housing, configured to accommodate a developer; and above-mentioned consumable chip.

Another aspect of the present disclosure provides a consumable. The consumable includes a photosensitive drum; a charging roller, configured to charge the photosensitive drum; and above-mentioned consumable chip.

Another aspect of the present disclosure provides an image-forming apparatus. The image-forming apparatus includes an image-forming control unit, and above-mentioned consumable chip.

Another aspect of the present disclosure provides a communication method. The method is applied to a consumable chip, the consumable chip is installed on a consumable, the consumable is installed on an image-forming apparatus, and the image-forming apparatus includes an image-forming control unit. The method includes receiving a first input signal and a second input signal which are determined based on first information to-be-transmitted and sent by the image-forming control unit through a first connection terminal and a second connection terminal, where the consumable chip includes a substrate disposed with the first connection terminal and the second connection terminal; the first connection terminal is connected to a first connection pin of the image-forming apparatus which is different from a power supply pin and a ground pin; and the second connection terminal is connected to a second connection pin on the image-forming apparatus which is different from the power supply pin and the ground pin; demodulating the first input signal and the second input signal to obtain demodulated signals; and determining the first information to-be-transmitted sent by the image-forming control unit according to the demodulated signals.

Another aspect of the present disclosure provides a contact state detection method. The method is applied to a consumable chip, the consumable chip is installed on a consumable, the consumable is installed on an image-forming apparatus, and the image-forming apparatus includes an image-forming control unit. The method includes configuring a first electrical parameter of a current loop formed between the consumable chip and the image-forming control unit, where the first electrical parameter is configured to determine whether a contact between the consumable chip and the image-forming control unit is desirable. The consumable chip includes a substrate disposed with a first connection terminal and a second connection terminal; the first connection terminal is connected to a first connection pin of the image-forming apparatus which is different from a power supply pin and a ground pin; and the second connection terminal is connected to a second connection pin on the image-forming apparatus which is different from the power supply pin and the ground pin.

Another aspect of the present disclosure provides a communication method. The method is applied to a consumable chip, the consumable chip is installed on a consumable, the consumable is installed on an image-forming apparatus, and the image-forming apparatus includes an image-forming control unit. The method includes performing contact state detection using above-mentioned method; and after determining that the contact between the consumable chip and the image-forming control unit is desirable, performing communication using above-mentioned method. The consumable chip includes the substrate disposed with the first connection terminal and the second connection terminal; the first connection terminal is connected to the first connection pin of the image-forming apparatus which is different from the power supply pin and the ground pin; and the second connection terminal is connected to the second connection pin on the image-forming apparatus which is different from the power supply pin and the ground pin.

Other aspects of the present disclosure may be understood by those skilled in the art in light of the description, the claims, and the drawings of the present disclosure.

BRIEF DESCRIPTION OF THE DRAWINGS

To clearly describe the technical solutions of various embodiments of the present disclosure, the drawings need to be used for describing various embodiments are described below. Obviously, the drawings in the following description are merely some embodiments of the present disclosure. For those skilled in the art, other drawings may be obtained in accordance with these drawings without creative efforts.

DETAILED DESCRIPTION

To better understand technical solutions of the present disclosure, embodiments of the present disclosure are described in detail with reference to accompanying drawings.

It should be noted that described embodiments are only a part of embodiments of the present disclosure, rather than all embodiments. Based on embodiments in the present disclosure, all other embodiments obtained by those skilled in the art without creative work shall fall within the protection scope of the present disclosure.

The terms used in embodiments of the present disclosure are only for the purpose of describing specific embodiments and are not intended to limit the present disclosure. The singular forms of "a", "the" and "said" used in embodiments of the present disclosure and the appended claims are also intended to include plural forms, unless the context clearly indicates other meanings.

It can be understood that the term "and/or" used in the specification may only be an association relationship describing associated objects, which means that there may be three types of relationships. For example, A and/or B can mean that: A alone exists, A and B exist at the same time, and B exists alone. In addition, the character "/" in the specification normally indicates that associated objects before and after are in an "or" relationship.

Figure 1:
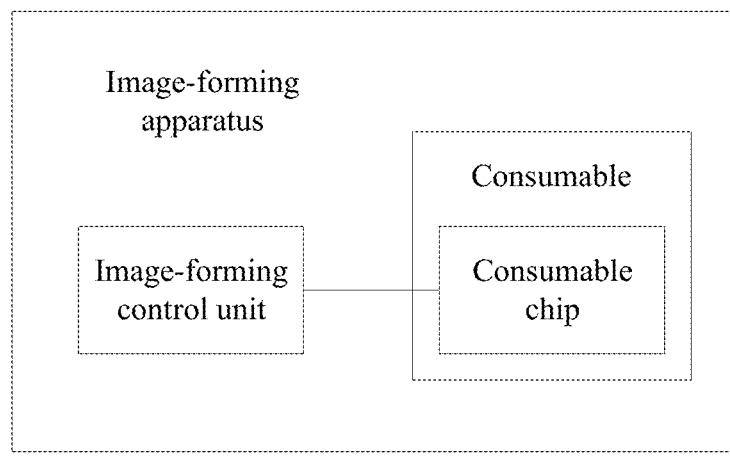
FIG. 1 illustrates a structural block diagram of an image-forming apparatus provided by exemplary embodiments of the present disclosure.

Referring to FIG. 1, FIG. 1 illustrates a structural block diagram of an image-forming apparatus provided by exemplary embodiments of the present disclosure. As shown in FIG. 1, the image-forming apparatus may include an image-forming control unit for controlling entire image-forming apparatus. The image-forming apparatus may be also detachably installed with a consumable which may be a developing cartridge, a drum cartridge, and the like. A consumable chip may be installed on the consumable, and the consumable chip may be communicatively connected to the image-forming control unit. During the image-forming process, the image-forming control unit may need to communicate with the consumable chip. For example, the image-forming control unit may need to obtain the image-forming auxiliary information in the consumable chip to complete the image-forming process. The image-forming auxiliary information may be configured for the identification of the consumable chip, recording the usage status of the material and the like.

In the existing technology, the image-forming control unit may normally communicate with the consumable chip through a 4-wire I2C interface. Therefore, 4 electrical contact points (corresponding to the 4 wires of the I2C interface) may need to be configured on the consumable chip; and the number of electrical contact points on the consumable chip may be relatively large.

To solve above-mentioned problems, embodiments of the present disclosure provide a consumable chip, which can be communicatively connected to an image-forming control unit through two signal lines. Therefore, only two electrical contact points may need to be configured on the consumable chip, thereby reducing the number of electrical contact points on the consumable chip, which is described in conjunction with accompanying drawings hereinafter.

Figure 2:
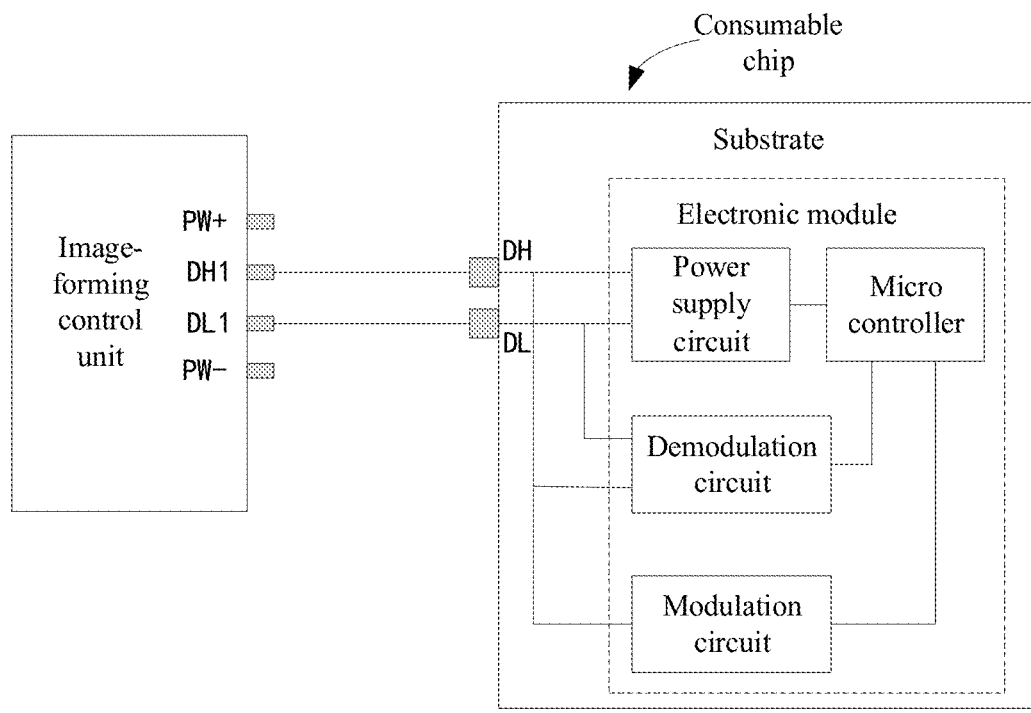
FIG. 2 illustrates a connection schematic of an image-forming control unit and a consumable chip provided by exemplary embodiments of the present disclosure.

Referring to FIG. 2, FIG. 2 illustrates a connection schematic of an image-forming control unit and a consumable chip provided by exemplary embodiments of the present disclosure. As shown in FIG. 2, the image-forming control unit may include a power supply pin PW+, a ground pin PW−, a first connection pin DH1 and a second connection pin DL1. The consumable chip may include a substrate, and the substrate may be disposed with a first connection terminal DH, a second connection terminal DL, and an electronic module electrically connected with the first connection terminal DH and the second connection terminal DL. When the consumable is installed on the image-forming apparatus, the first connection terminal DH may be connected to the first connection pin DH1, and the second connection terminal DL may be connected to the second connection pin DL1. It should be noted that the image-forming control unit in FIG. 2 is only an exemplary illustration. In practical applications, the image-forming control unit may also be provided with other input and output pins, which may not be described in embodiments of the present disclosure.

Referring to FIG. 2, the electronic module in the consumable chip provided by embodiments of the present disclosure may include a power supply circuit, a demodulation circuit, a modulation circuit, and a microcontroller.

The power supply circuit may be electrically connected with the first connection terminal DH, the second connection terminal DL and the microcontroller; and the power supply circuit may be configured to convert the first input signal and the second input signal received through the first connection terminal DH and the second connection terminal DL into a DC voltage to supply power to the microcontroller. That is, the microcontroller may be powered through the first input signal and the second input signal in the signal line. In some optional implementation manners, for example, the first input signal may be a data signal, and the second input signal may be a clock signal.

Figure 3:
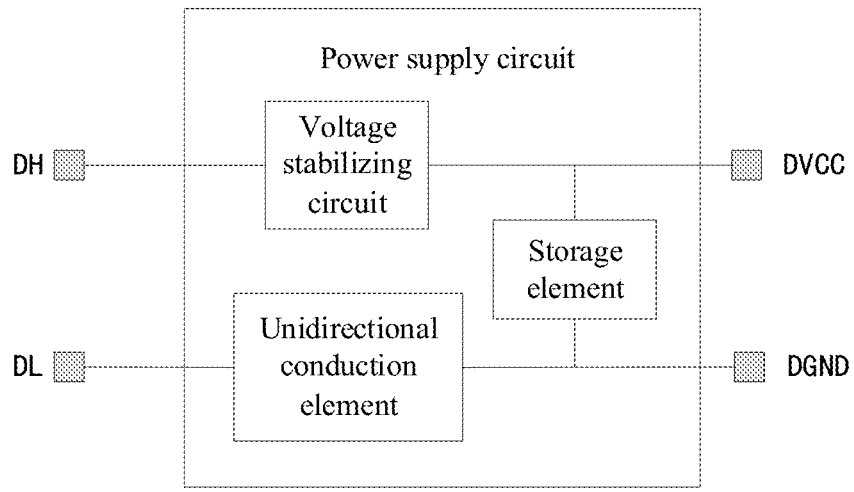
FIG. 3 illustrates a structural schematic of a power supply circuit provided by exemplary embodiments of the present disclosure.

Referring to FIG. 3, FIG. 3 illustrates a structural schematic of a power supply circuit provided by exemplary embodiments of the present disclosure. As shown in FIG. 3, the power supply circuit may include a voltage stabilizing circuit, an energy storage element, and a unidirectional conduction element. The voltage stabilizing circuit, the energy storage element and the unidirectional conduction element may be connected in series in the loop between the first connection terminal DH and the second connection terminal DL; and two terminals of the energy storage element may also be respectively connected to a first power input terminal DVCC and a second power input terminal DGND of the microcontroller. Since the first input signal and the second input signal received by the power supply circuit through the first connection terminal DH and the second connection terminal DL are unstable high/low-level signals, the voltage difference between the first connection terminal DH and the second connection terminal DL may be not stable. In order to provide a stable DC voltage to the microcontroller, in embodiments of the present disclosure, the voltage difference between the first connection terminal DH and the second connection terminal DL may be converted into a stable DC voltage by the voltage stabilizing circuit, thereby supplying power to the microcontroller and charging the energy storage element. In addition, since the first input signal and the second input signal are unstable high/low-level signals, the voltage difference between the first connection terminal DH and the second connection terminal DL may be lower than the power supply voltage of the microcontroller, or a reverse voltage may be formed between the first connection terminal DH and the second connection terminal DL. In embodiments of the present disclosure, when the voltage difference between the first connection terminal DH and the second connection terminal DL is lower than the power supply voltage of the microcontroller, the microcontroller may be powered through the energy storage element to prevent the microcontroller from powering down. In addition, unidirectional conduction of the loop between the first connection terminal DH and the second connection terminal DL may be controlled by the unidirectional conduction element, thereby avoiding inputting reverse voltage at the first power input terminal DVCC and the second power input terminal DGND of the microcontroller. The energy storage element may be an element such as a capacitor, a battery, an inductor, or the like, which may not be limited herein. The cathode of the unidirectional conduction element may be connected to the second connection terminal DL.

Figure 4A:
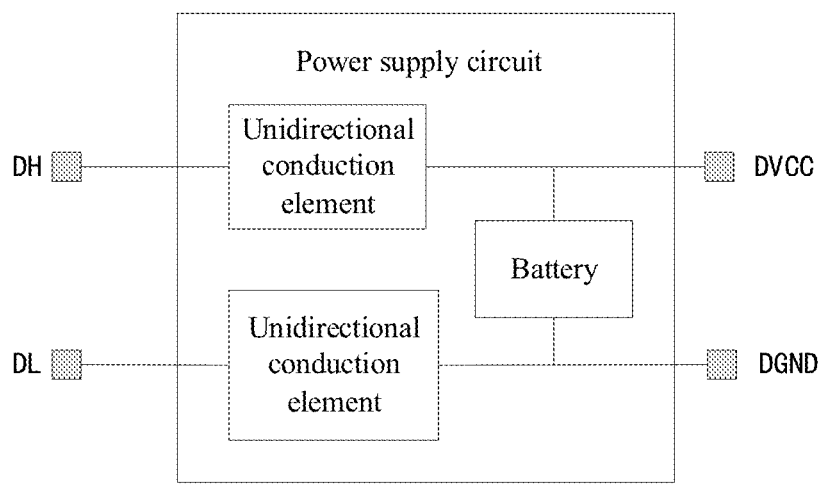
FIG. 4A illustrates a structural schematic of another power supply circuit provided by exemplary embodiments of the present disclosure.
Figure 4B:
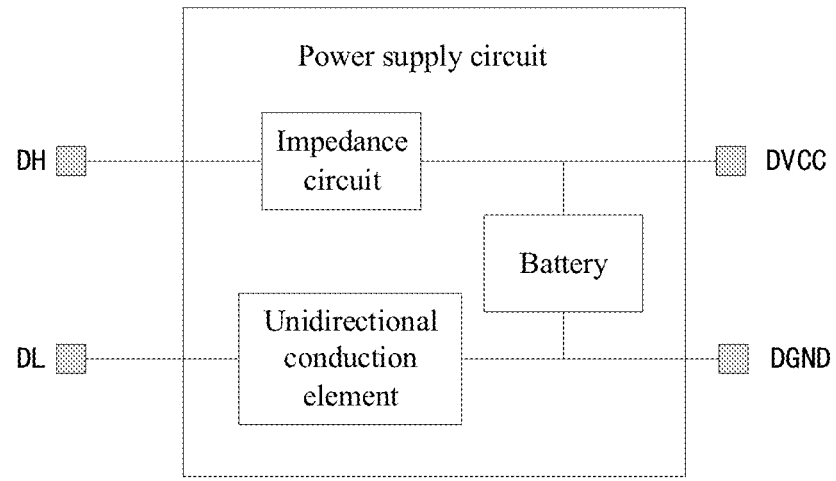
FIG. 4B illustrates a structural schematic of another power supply circuit provided by exemplary embodiments of the present disclosure.

Referring to FIG. 4A, FIG. 4A illustrates a structural schematic of another power supply circuit provided by exemplary embodiments of the present disclosure. As shown in FIG. 4A, the difference between such power supply circuit and the power supply circuit shown in FIG. 3 is that a stable DC voltage may be provided to the microcontroller through a battery. For example, the positive and cathodes of the battery may be respectively connected to the first power input terminal DVCC and the second power input terminal DGND of the microcontroller. In addition, in order to avoid the reverse loading of the voltage outputted by the battery to the first connection pin and the second connection pin of the image-forming control unit which may result in interference to the image-forming control unit, in embodiments of the present disclosure, an unidirectional conduction element may be connected in series between the another of the battery and the first connection terminal DH, and between the cathode of the battery and the second connection terminal DL, respectively. The anode of the unidirectional conduction element between the anode of the battery and the first connection terminal DH may be connected to the first connection terminal DH; and the cathode of the unidirectional conducting element between the cathode of the battery and the second connection terminal DL may be connected to the second connection terminal DL. In some optional implementation manners, the unidirectional conduction element between the anode of the battery and the first connection terminal DH can also be replaced with an impedance circuit, as shown in FIG. 4B, that is, the first connection pin of the image-forming control unit may be separated and protected by the impedance circuit, which may not be limited in embodiments of the present disclosure.

In some optional implementation manners, the unidirectional conduction element in the power supply circuit shown in FIG. 3 may also be omitted, which may not be limited herein.

In some optional implementation manners, when the unidirectional conduction element is not included in the power supply circuit and when the voltage stabilizing circuit is replaced by the battery, the anode of the battery may be connected to the first connection terminal DH, and the cathode of the battery may be connected to the second connection terminal DL. Obviously, the impedance element may also be disposed between the cathode of the battery and the second connection terminal DL, which may not be limited herein.

Referring to FIG. 2, the demodulation circuit provided by embodiments of the present disclosure may be configured to demodulate the first input signal and the second input signal to obtain demodulated signals. The first input signal and the second input signal may be signals determined by the image-forming control unit based on the first information to-be-transmitted. The first information to-be-transmitted may be information which needs to be sent from the image-forming control unit to the consumable chip. After the demodulation circuit obtains the demodulated signals, the demodulated signals may be sent to the microcontroller; and the microcontroller may then obtain the information sent by the image-forming control unit to the consumable chip according to the demodulated signals, that is, above-mentioned first information to-be-transmitted.

In an optional implementation manner, the demodulation circuit may be configured to demodulate the first input signal and the second input signal into digital signals, and the microcontroller may determine the first information to-be-transmitted according to the digital signals.

In another optional implementation manner, the demodulation circuit may be configured to demodulate the first input signal and the second input signal respectively to obtain electrical parameters corresponding to the first input signal and the second input signal. For example, the electrical parameters may be the voltage value corresponding to the first input signal and the second input signal. The microcontroller may determine the first information to-be-transmitted according to the electrical parameters corresponding to the first input signal and the second input signal, which is described in conjunction with accompanying drawings hereinafter.

Figure 5:
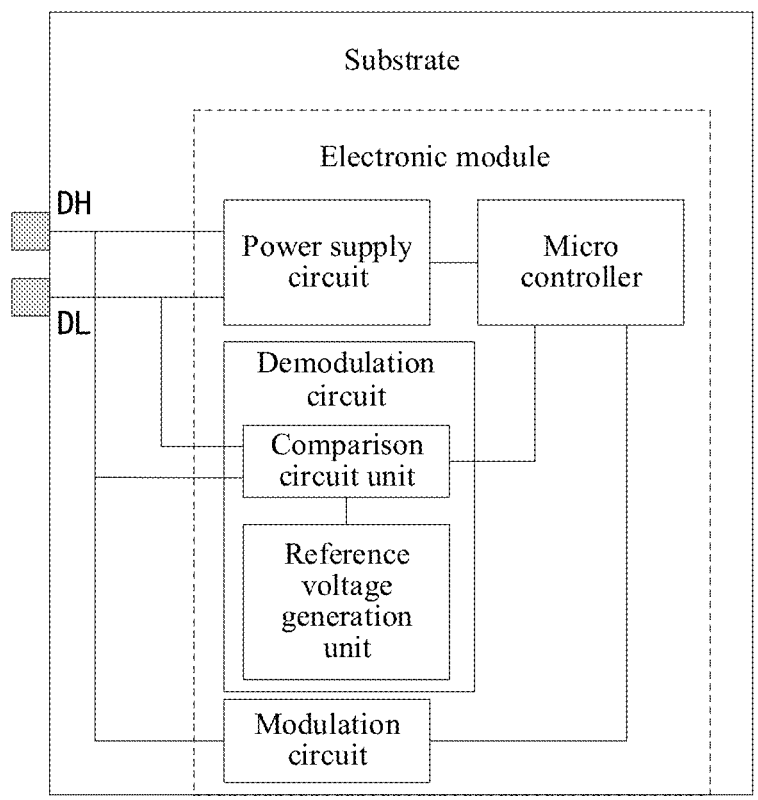
FIG. 5 illustrates a structural schematic of a consumable chip provided by exemplary embodiments of the present disclosure.

Referring to FIG. 5, FIG. 5 illustrates a structural schematic of a consumable chip provided by exemplary embodiments of the present disclosure. As shown in FIG. 5, in embodiments of the present disclosure, the demodulation circuit may include a reference voltage generation unit and a comparison circuit unit, where the reference voltage generation unit may be configured for generating a plurality of first reference voltage signals and a plurality of second reference voltage signals, and "the plurality" refers to two or more. The comparison circuit unit may be configured for comparing the first input signal with the plurality of first reference voltage signals respectively to obtain a plurality of first comparison results, and/or for comparing the second input signal with the plurality of second reference voltage signals respectively to obtain a plurality of second comparison results. The plurality of first comparison results may be configured to determine the electrical parameter corresponding to the first input signal, and the plurality of second comparison results may be configured to determine the electrical parameter corresponding to the second input signal. For example, the reference voltage generation unit may generate N first reference voltages, for example, a first reference voltage 1, a first reference voltage 2, . . . , a first reference voltage N−1, and a first reference voltage N; and the N first reference voltages may be sequentially increased.

The first input signal may be compared with the N first reference voltages, respectively, to obtain a comparison result between the first input signal and each of the first reference voltages, that is, a first comparison result. If the first input signal is greater than a first reference voltage k (where $1 \leq k < N$) and less than a first reference voltage k+1, it may determine that the voltage value of the first input signal may be between the first reference voltage k and the first reference voltage k+1; furthermore, the voltage value of the first input signal may be determined, that is, the electrical parameter of the first input signal may be determined. Similarly, the electrical parameter corresponding to the second input signal may be determined according to the plurality of second comparison results, which may not be described in detail in embodiments of the present disclosure.

Figure 6:
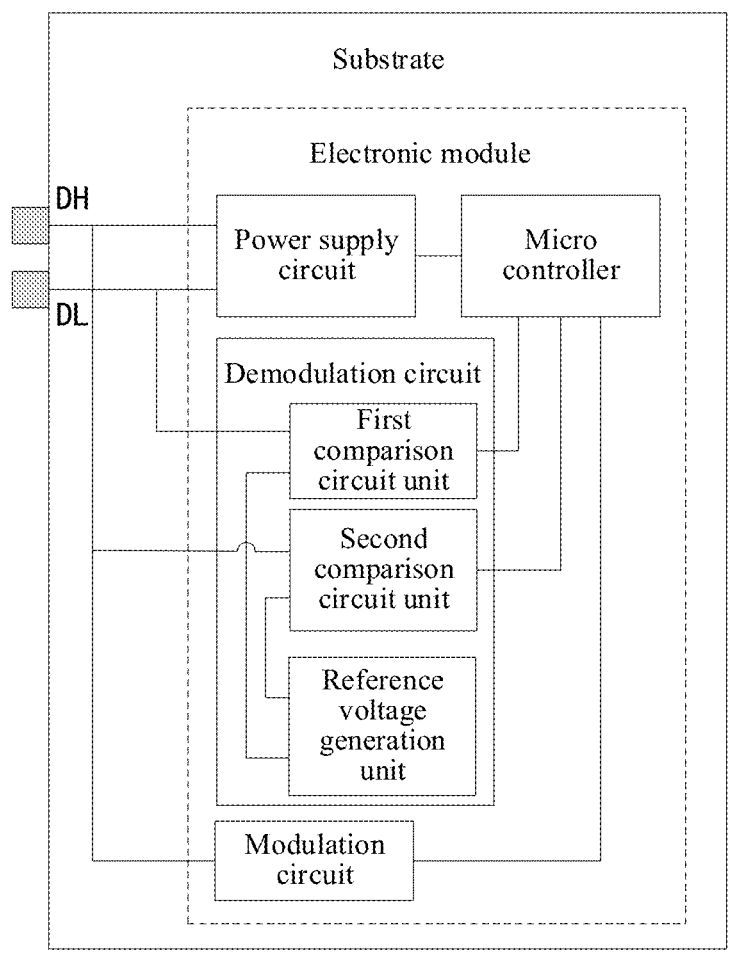
FIG. 6 illustrates a structural schematic of another consumable chip provided by exemplary embodiments of the present disclosure.

Referring to FIG. 6, FIG. 6 illustrates a structural schematic of another consumable chip provided by exemplary embodiments of the present disclosure. As shown in FIG. 6, in embodiments of the present disclosure, the comparison circuit unit may include a first comparison circuit unit and a second comparison circuit unit. The first input terminal of the first comparison circuit unit may be connected to the first connection terminal DH, the second input terminal of the first comparison circuit unit may be connected to the first reference voltage output terminal of the reference voltage generation unit, the first reference voltage output terminal may be configured to output the first reference voltage, and the output terminal of the first comparison circuit unit may be connected to the input and output terminal of the microcontroller. The first input terminal of the second comparison circuit unit may be connected to the second connection terminal DL, the second input terminal of the second comparison circuit unit may be connected to the second reference voltage output terminal of the reference voltage generation unit, the second reference voltage output terminal may be configured to output the second reference voltage, and the output terminal of the second comparison circuit unit may be connected to the input and output terminal of the microcontroller. The working principle of the first comparison circuit unit and the second comparison circuit unit in embodiments of the present disclosure may refer to the description of the comparison circuit unit in one embodiment shown in FIG. 5, which may not be described in detail herein for brevity.

In some optional implementation manners, when the unidirectional conduction element is not disposed between the second connection terminal DL and the power supply circuit, the second connection terminal DL may be directly connected to the power supply circuit or the second connection terminal DL may be connected to the power supply circuit through the impedance element; and the consumable chip may be connected to the image-forming control unit of the image-forming apparatus through the first connection terminal DH and the second connection terminal DL, and may not be connected to the GND terminal of the image-forming control unit. At this point, the demodulation circuit shown in FIG. 5 may only be connected to the first connection terminal DH and may not need to be connected to the second connection terminal DL. Correspondingly, the first comparison circuit and the second comparison circuit described in FIG. 6 may be only connected to the first connection terminal DH and may not need to be connected to the second connection terminal. At this point, when the consumable chip receives the first input signal and the second input signal through the first connection terminal DH and the second connection terminal DL, the superposition of the first input signal and the second input signal may be obtained at the first connection terminal DH. Based on the structure of the consumable chip, the following further describes how the first input signal and the second input signal are demodulated. It should be noted that the first input signal and the second input signal may have different pulse widths.

For example, the microcontroller may include a timing unit, and the demodulation circuit may include the reference voltage generation unit for generating the plurality of first reference voltages and the plurality of second reference voltage signals; the comparison unit may be configured to compare the superimposed signal with the plurality of first reference voltages to obtain the plurality of first comparison results, and/or to compare the superimposed signal with the plurality of second reference voltage signals to obtain the plurality of second comparison results; and the timing unit may be configured to measure the time width of the first comparison results to obtain the plurality of measurement results.

Figure 15:
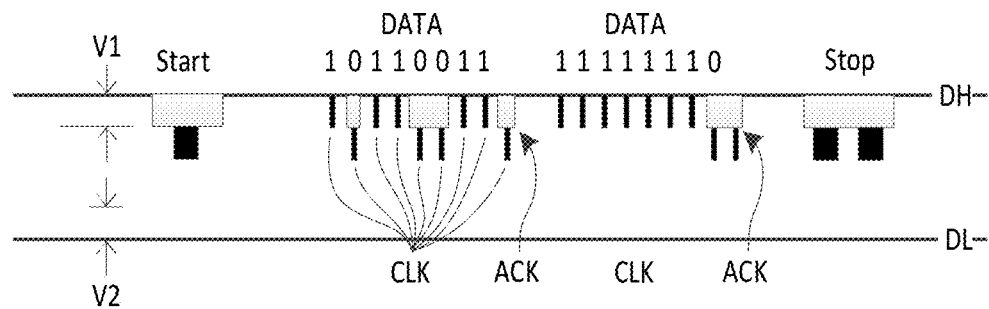
FIG. 15 illustrates another waveform diagram of a data signal and a clock signal provided by exemplary embodiments of the present disclosure.

The plurality of first comparison results, the plurality of second comparison results and the plurality of measurement results may be configured to determine the electrical parameter corresponding to the first input signal and the electrical parameter corresponding to the second input signal. For example, the reference voltage generation unit may generate N first reference voltages, including a first reference voltage 1, a first reference voltage 2, . . . , a first reference voltage N−1, and a first reference voltage N; and the N first reference voltages may be sequentially increased; the reference voltage generation unit may generate N second reference voltages, including a second reference voltage 1, a second reference voltage 2, . . . , a second reference voltage N−1, and a second reference voltage N; and the N second reference voltages may be sequentially increased. The superimposed signal may be compared with the N first reference voltages respectively to obtain a comparison result between the superimposed signal and each of the first reference voltages, that is, the first comparison result; furthermore, the superimposed signal may be compared with the N second reference voltages respectively to obtain a comparison result between the superimposed signal and each of the second reference voltages, that is, the second comparison result. The timing unit included in the microcontroller may be capable of measuring the time width of the first comparison result to obtain the measurement result. When the measurement result is greater than a preset threshold, it is determined that the first comparison result may correspond to the first input signal inputted by the first connection terminal; and when the measurement result is less than or equal to the threshold, it is determined that the first comparison result may correspond to the second input signal inputted by the second connection terminal. Furthermore, referring to above-mentioned manner, if the first input signal is greater than the first reference voltage k (where 1≤k<N) and less than the first reference voltage k+1, it is determined that the voltage value of the first input signal may be between the first reference voltage k and the first reference voltage k+1; furthermore, the voltage value of the first input signal may be determined, that is, the electrical parameter of the first input signal may be determined. Similarly, the electrical parameter corresponding to the second input signal may be determined according to the plurality of second comparison results, which may not be described in detail in embodiments of the present disclosure. Exemplarily, as shown in FIG. 15, the superimposed signal may be obtained on the first connection terminal DH.

Furthermore, the comparison circuit unit may include the first comparison circuit unit and the second comparison circuit unit. The first input terminal of the first comparison circuit unit may be connected to the first connection terminal DH, the second input terminal DL of the first comparison circuit unit may be connected to the first reference voltage output terminal of the reference voltage generation unit, the first reference voltage output terminal may be configured to output the first reference voltage, and the output terminal of the first comparison circuit unit may be connected to the input and output terminal of the microcontroller. The first input terminal of the second comparison circuit unit may be connected to the first connection terminal DH, the second input terminal of the second comparison circuit unit may be connected to the second reference voltage output terminal of the reference voltage generation unit, the second reference voltage output terminal may be configured to output the second reference voltage, and the output terminal of the second comparison circuit unit may be connected to the input and output terminal of the microcontroller. The working principle of the first comparison circuit unit and the second comparison circuit unit in embodiments of the present disclosure may refer to the description of the comparison circuit unit in above-mentioned description embodiments, which may not be described in detail herein for brevity.

Referring to FIG. 2, the modulation circuit provided by embodiments of the present disclosure may be configured to send the modulation signal to the image-forming control unit through the first connection terminal DH and/or the second connection terminal DL. The modulation signal may be a modulation signal obtained by modulating the second information to-be-transmitted by the modulation circuit. The second information to-be-transmitted may be the information which needs to be sent from the consumable chip to the image-forming control unit. After receiving the modulated signal based on the first connection pin DH1 and/or the second connection pin DL1, the image-forming control unit may demodulate the modulated signal, thereby obtaining the second information to-be-transmitted.

Figure 7:
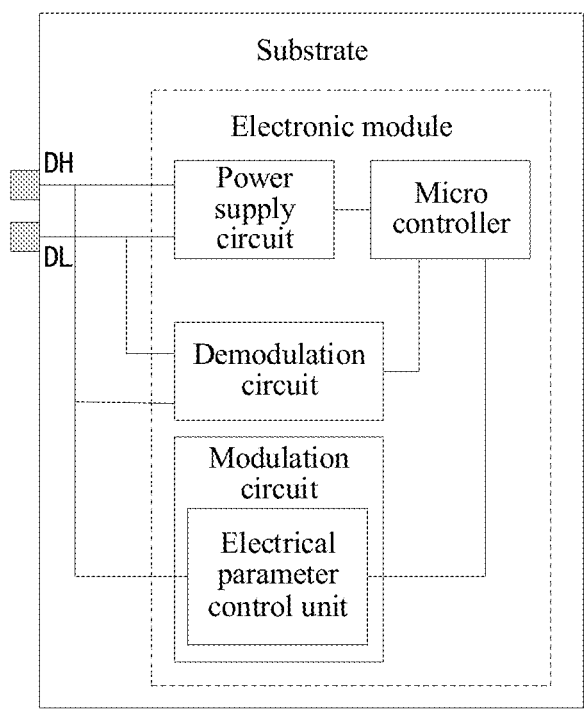
FIG. 7 illustrates a structural schematic of another consumable chip provided by exemplary embodiments of the present disclosure.

Referring to FIG. 7, FIG. 7 illustrates a structural schematic of another consumable chip provided by exemplary embodiments of the present disclosure. As shown in FIG. 7, in embodiments of the present disclosure, the modulation circuit may include an electrical parameter control unit, and when the consumable is installed on the image-forming apparatus, the electrical parameter control unit may be configured to control the electrical parameter of the current loop formed between the image-forming control unit and the consumable chip. That is, in embodiments of the present disclosure, the modulation signal may be the electrical parameter of the current loop formed between the image-forming control unit and the consumable chip. The electrical parameter may be a current value, a voltage value, a resistance value or the like, which may not be limited herein.

Figure 8:
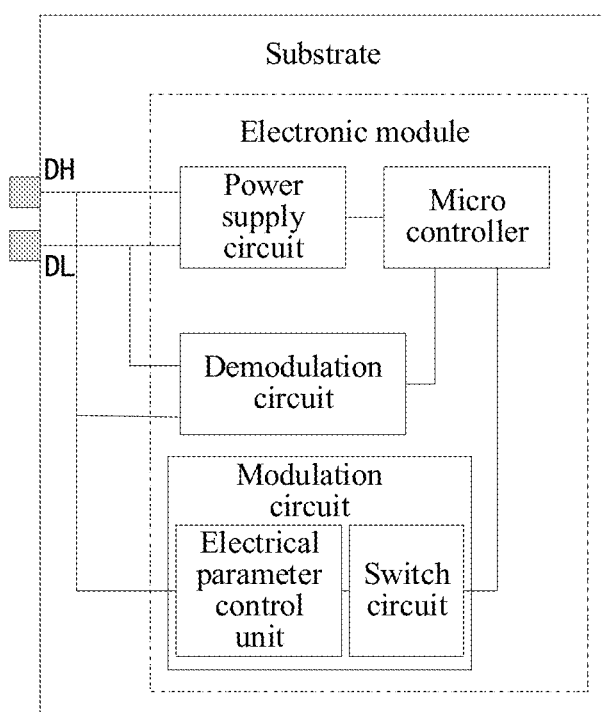
FIG. 8 illustrates a structural schematic of another consumable chip provided by exemplary embodiments of the present disclosure.

Referring to FIG. 8, FIG. 8 illustrates a structural schematic of another consumable chip provided by exemplary embodiments of the present disclosure. As shown in FIG. 8, in embodiments of the present disclosure, the electrical parameter control unit may include an electrical parameter configuration unit and a switch circuit. The electrical parameter configuration unit may be configured to, for example, set the electrical parameter of the current loop formed between the image-forming control unit and the consumable chip when the consumable is installed on the image-forming apparatus. The switch circuit may be configured to, for example, enable the electrical parameter configuration unit when the switch circuit is turned on to be in conduction, and disable the electrical parameter configuration unit when the switch circuit is turned off to be in disconnection. It should be understood that only when the consumable chip needs to send the second information to-be-transmitted to the image-forming control unit, the electrical parameter configuration unit may need to modulate the second information to-be-transmitted, and further set the electrical parameter of the current loop formed between the image-forming control unit and the consumable chip. Therefore, when the consumable chip needs to send the second information to-be-transmitted to the image-forming control unit, the switch circuit may be controlled to be turned on, such that the electrical parameter configuration unit may be enabled. When the consumable chip does not need to send the second information to-be-transmitted to the image-forming control unit (for example, the consumable chip only needs to receive the first information to-be-transmitted sent by the image-forming control unit), the switch circuit may be controlled to be disconnected, such that the electrical parameter configuration unit may be not enabled.

In embodiments of the present disclosure, the consumable chip may be connected to the first connection pin DH1 and the second connection pin DL1 in the image-forming control unit through the first connection terminal DH and the second connection terminal DL respectively, that is, the consumable chip may communicate with the image-forming control unit through two signal lines. Only two electrical contact points may need to be set on the consumable chip, which may reduce the number of electrical contacts on the consumable chip and furthermore improve the contact reliability and reduce the area of the consumable chip. In addition, the first connection pin DH1 and the second connection pin DL1 in the image-forming control unit may be pins different from the power supply pin PW+ and the ground pin PW−, that is, two signal lines connecting the image-forming apparatus and the consumable chip may be dedicated signal lines. Compared with signal transmission through the power supply line and the ground line (normally only the modulation and demodulation signals can be transmitted through the power supply line, so that the transmission efficiency between the image-forming control unit and the consumable chip may be low, and the power supply capability may be poor), the communication transmission speed may be faster, and the power supply capability may be desirable through two dedicated signal lines, and consumable chips with higher power consumption may be used.

In some optional implementation manners, two dedicated signal lines may be configured to transmit the data signal and clock signal, respectively; and through mutual cooperation of the data signal and the clock signal, the signal transmitted between the image-forming control unit and the consumable chip may be more stable.

For ease of understanding, the consumable chips provided in various embodiments of the present disclosure are described below with reference to specific circuit diagrams.

Figure 9:
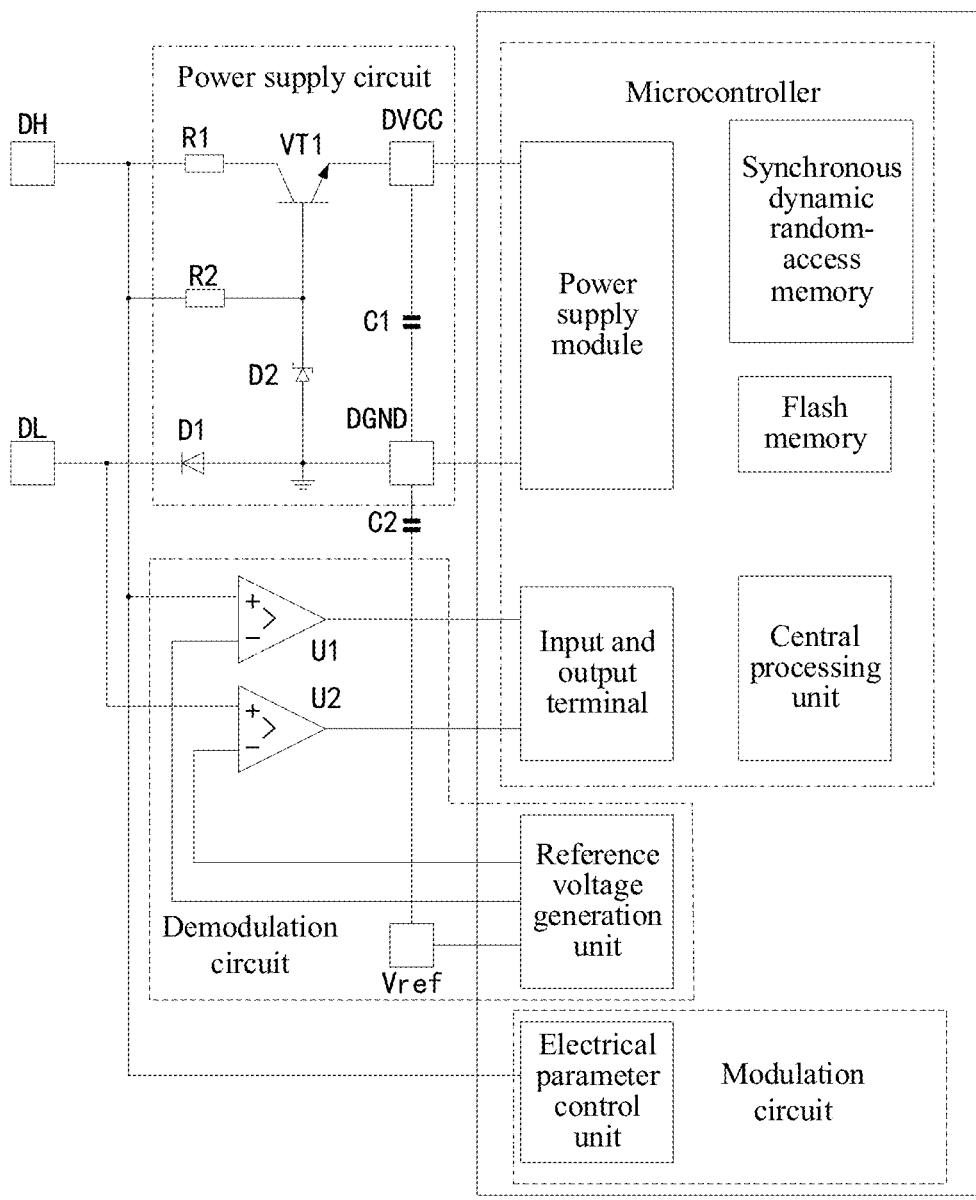
FIG. 9 illustrates a schematic of a circuit structure of a consumable chip provided by exemplary embodiments of the present disclosure.

Referring to FIG. 9, FIG. 9 illustrates a schematic of a circuit structure of a consumable chip provided by exemplary embodiments of the present disclosure. As shown in FIG. 9, in the power supply circuit, the unidirectional conduction element may be a diode D1, the energy storage element may be a first capacitor C1, and the voltage stabilizing circuit may include a first resistor R1, a second resistor R2, a first triode VT1 and a voltage stabilizing diode D2. The first connection terminal DH may be connected to the collector of the first triode VT1 through the first resistor R1; the first connection terminal DH may be connected to the base of the first triode VT1 through the second resistor R2; the emitter of the first triode VT1 may be connected to the first power supply input terminal DVCC of the microcontroller, and the first power supply input terminal DVCC may be the power supply terminal; the base of the first triode VT1 may be connected to the cathode of the voltage stabilizing diode D2, the anode of the voltage stabilizing diode D2 may be connected to the second power input terminal DGND of the microcontroller, and the second power input terminal DGND may be a ground terminal; and the first terminal of the first capacitor C1 may be connected to the first power input terminal DVCC, and the second terminal of the first capacitor C1 may be connected to the second power input terminal DGND. The voltage stabilizing circuit including the first resistor R1, the second resistor R2, the first triode VT1 and the voltage stabilizing diode D2 may be configured to convert the voltage difference between the first connection terminal DH and the second connection terminal DL into a stable DC voltage. The DC voltage may be transmitted to the first power input terminal DVCC and the second power input terminal DGND of the microcontroller and may charge the first capacitor C1. The first capacitor C1 may be configured for the power supply filtering of the microcontroller. When the voltage difference between the first connection terminal DH and the second connection terminal DL is lower than the power supply voltage of the microcontroller, the microcontroller may be powered through the first capacitor C1 to prevent the microcontroller from being powered down. The diode D1 may be configured to control the unidirectional conduction of the loop between the first connection terminal DH and the second connection terminal DL, which may avoid that when the voltage of the first connection terminal DH is lower than the voltage of the second connection terminal DL, reverse voltage may be inputted to the first power input terminal DVCC and the second power input terminal DGND of the microcontroller.

The demodulation circuit may include the reference voltage generation unit, a first comparator U1 and a second comparator U2. The first comparator U1 and the second comparator U2 may be respectively equivalent to the first comparison circuit unit and the second comparison circuit unit in one embodiment shown in FIG. 6. The positive input terminal of the first comparator U1 may be connected to the first connection terminal DH, and the negative input terminal of the first comparator U1 may be connected to the first reference voltage output terminal of the reference voltage generation unit, the first reference voltage output terminal may be configured to output the first reference voltage, and the output terminal of the first comparator U1 may be connected to the input and output terminal of the microcontroller. The positive input terminal of the second comparator U2 may be connected to the second connection terminal DL, the negative input terminal of the second comparator U2 may be connected to the second reference voltage output terminal of the reference voltage generation unit, the second reference voltage output terminal may be configured to output the second reference voltage, and the output terminal of the second comparator U2 may be connected to the input and output terminal of the microcontroller. The first comparator U1 may be configured to compare the first input signal with the plurality of first reference voltage signals respectively to obtain the plurality of first comparison results and transmit the plurality of first comparison results to the input and output terminal of the microcontroller; and the microcontroller may determine the electrical parameter corresponding to the first input signal according to the plurality of first comparison results. The electrical parameter may be a voltage value. Similarly, the second comparator U2 may be configured to compare the second input signal with the plurality of second reference voltage signals respectively to obtain the plurality of second comparison results and transmit the plurality of second comparison results to the input and output terminal of the microcontroller; and the microcontroller may determine the electrical parameter corresponding to the second input signal according to the plurality of second comparison results.

In an optional implementation manner, the first input signal may be a data signal, and the second input signal may be a clock signal. After configuring appropriate reference voltage, the first comparator U1 and the second comparator U2 may demodulate the first input signal and the second input signal respectively and output pulse signals that can be recognized by the microcontroller, thereby completing the extraction of data signal and clock signal.

In addition, the reference voltage generation unit may further include a third reference voltage output terminal Vref; and a second capacitor C2 may be disposed between the third reference voltage output terminal Vref and the second power input terminal DGND of the microcontroller.

The modulation circuit may include the electrical parameter control unit. When the consumable is installed on the image-forming apparatus, the electrical parameter control unit may be configured to control the electrical parameter of the current loop formed between the image-forming control unit and the consumable chip. For example, the electrical parameter may be a current value or a resistance value. The electrical parameter control unit may control the current of the current loop formed between the image-forming control unit and the consumable chip, thereby realizing signal modulation of the second information to-be-transmitted sent by the consumable chip.

In some optional embodiments, the circuit structure of the consumable chip shown in FIG. 9 may be modified. For example, the unidirectional conduction element D1 between the second connection terminal DL and DGND may be removed; or the unidirectional conduction element D1 may be replaced with the impedance element, then the first connection terminal DH may be connected to the demodulation circuit. For example, the first connection terminal DH may be respectively connected to the positive terminals of the first comparator U1 and the second comparator U2. That is, when the consumable chip receives the first input signal and the second input signal through the first connection terminal DH and the second connection terminal DL, the superimposed signal of the first input signal and the second input signal may be obtained at the first connection terminal.

Figure 10:
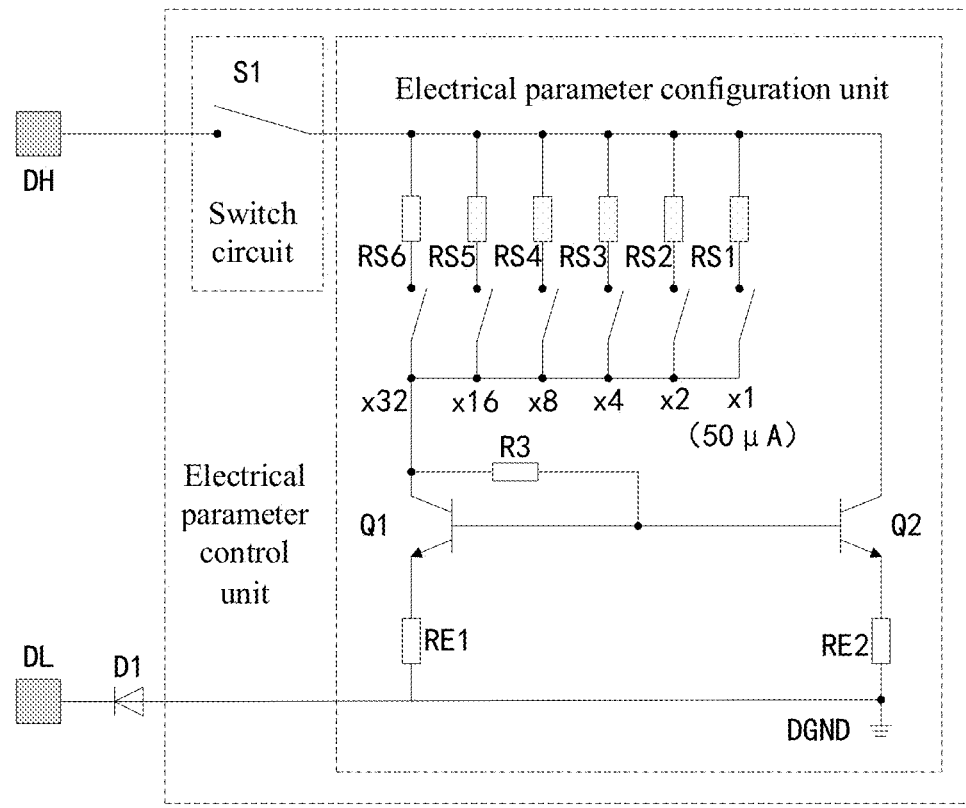
FIG. 10 illustrates a circuit diagram of an electrical parameter control unit provided by exemplary embodiments of the present disclosure.

Referring to FIG. 10, FIG. 10 illustrates a circuit diagram of an electrical parameter control unit provided by exemplary embodiments of the present disclosure. As shown in FIG. 10, the electrical parameter control unit may include the electrical parameter configuration unit and the switch circuit. The switch circuit may include a switch device S1; and the electrical parameter configuration unit may include a plurality of resistors RS1, RS2, RS3, RS4, RS5 and RS6, a plurality of switch devices x1, x2, x4, x8, x16 and x32 corresponding to the plurality of resistors, two triodes Q1 and Q2, and 3 resistors RE1, RE2 and R3. The first terminals of the resistors RS1, RS2, RS3, RS4, RS5 and RS6 may be respectively connected with the first connection terminal DH through the switch device S1; the second terminals of the resistors RS1, RS2, RS3, RS4, RS5 and RS6 may be respectively connected with the first terminals of the switch devices x1, x2, x4, x8, x16 and x32; the second terminals of the switch devices x1, x2, x4, x8, x16, and x32 may be respectively connected to the collector of the triode Q1; the base electrode of the triode Q1 and the base electrode of the triode Q2 may be respectively connected to the second terminal of the resistor R3; the first terminal of the resistor R3 may be connected to the collector of the triode Q1; the emitter of the triode Q1 may be connected to the first terminal of the resistor RE1; the second terminal of the resistor RE1 may be connected to the anode of the diode D1; the cathode of the diode D1 may be connected to the second connection terminal DL; the collector of the triode Q2 may be connected to the first terminals of the resistors RS1, RS2, RS3, RS4, RS5, and RS6; the emitter of the triode Q2 may be connected to the first terminal of the resistor RE2; the second terminal of the resistor RE2 may be connected to the anode of the diode D1; and the second terminal of the resistor RE2 may be grounded. Using such connection manner, the current in the loop of the first connection terminal DH and the second connection terminal DL may be controlled by controlling the switch states of the switch devices x1, x2, x4, x8, x16, and x32. For example, when the switch device x1 is controlled to be closed and other switch devices are controlled to be opened, the current in the loop of the first connection terminal DH and the second connection terminal DL may be 50 µA; when the control switch device x2 is controlled to be closed and other switch devices are controlled to be opened, the current in the loop of the first connection terminal DH and the second connection terminal DL may be 100 µA; when the switch device x4 is controlled to be closed and other switch devices are controlled to be opened, the current in the loop of the first connection terminal DH and the second connection terminal DL may be 200 µA, and so on. Each switch device may correspond to a loop current value, and the magnitude of the loop current value corresponding to each switch device may be related to the magnitude of the resistance connected in series with the switch device, which may be adjusted by those skilled in the art as required. In addition, more choices of loop current values may be obtained by combinations of multiple switches. For example, the switch devices x1, x2 may be controlled to be closed, and the other switch devices may be controlled to be opened; or the switch devices x2, x4, and x32 may be controlled to be closed, and the other switch devices may be controlled to be opened; and so on. Exemplarily, in a similar manner, the resistance values in the loop of the first connection terminal DH and the second connection terminal DL may be respectively set to 50 ohms, 100 ohms, 200 ohms and the like, which may not be limited herein.

In addition, the switch device S1 may be configured to control the enable state of the electrical parameter configuration unit. It can be understood that when the switch device S1 is closed, the electrical parameter configuration unit may be enabled; when the switch device S1 is opened, the electrical parameter configuration unit may be not enabled.

Figure 11:
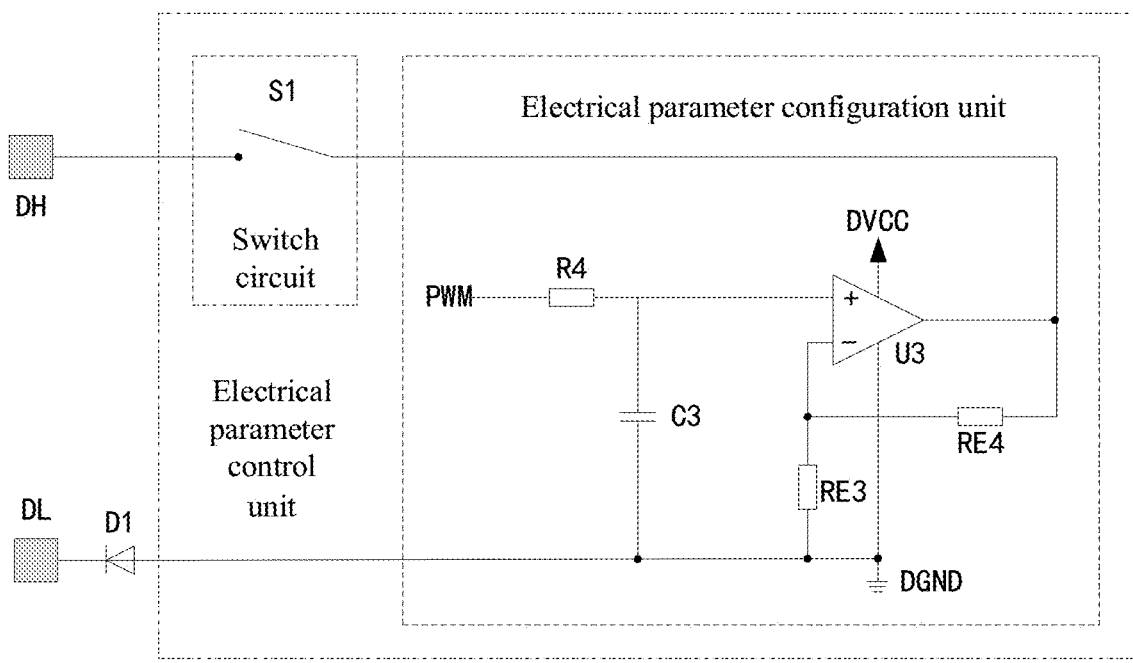
FIG. 11 illustrates a circuit diagram of another electrical parameter control unit provided by exemplary embodiments of the present disclosure.

Referring to FIG. 11, FIG. 11 illustrates a circuit diagram of another electrical parameter control unit provided by exemplary embodiments of the present disclosure. As shown in FIG. 11, the electrical parameter control unit may include the electrical parameter configuration unit and the switch circuit. The switch circuit may include the switch device S1; and the electrical parameter configuration unit may include a resistor R4, an operational amplifier U3, a capacitor C3, a resistor RE3 and a resistor RE4. The positive input terminal of the operational amplifier U3 may be connected to the second terminal of the resistor R4, the negative input terminal of the operational amplifier U3 may be connected to the first terminal of the resistor RE3, the second terminal of the resistor RE3 may be connected to the anode of the diode D1, the cathode of the diode D1 may be connected to the second connection terminal DL, the output terminal of the operational amplifier U3 may be connected to the first connection terminal DH through the switch device S1, the first terminal of the resistor RE4 may be connected to the first terminal of the electronic RE3, the second terminal of the resistor RE4 may be connected to the output terminal of the operational amplifier U3, and the first terminal of the resistor R4 may be configured to input a pulse width modulated PWM signal. Using such connection manner, the current in the loop of the first connection terminal DH and the second connection terminal DL may be controlled by the electrical parameter configuration unit. The parameter configuration of the resistor RE3 and the resistor RE4 may depend on the voltage amplitude of the PWM signal and the voltage ratio between the first connection terminal DH and the second connection terminal DL.

In addition, the switch device S1 may be configured to control the enable state of the electrical parameter configuration unit. It can be understood that when the switch device S1 is closed, the electrical parameter configuration unit may be enabled; when the switch device S1 is opened, the electrical parameter configuration unit may be not enabled.

It should be pointed out that FIG. 10 and FIG. 11 are only an exemplary illustration of the electrical parameter control unit in embodiments of the present disclosure; and those skilled in the art may also implement the control of the loop current through other circuits, which may be not limited in various embodiments of the present disclosure.

Referring to FIG. 9, the microcontroller provided by embodiments of the present disclosure may include a power supply module, a synchronous dynamic random-access memory (SDRAM), a flash memory (FLASH), a central processing unit (CPU), and an input and output terminal (GPIO). The power supply module may include a first power supply input terminal DVCC and a second power supply input terminal DGND, which are configured for receiving the power input from the power supply circuit and supplying power to the microprocessor. The input and output terminal may be configured to realize the information interaction of the microprocessor, such as receiving the demodulated signal outputted by the demodulation circuit. The central processing unit, flash memory, and synchronous dynamic random-access memory may be configured for data processing functions.

Corresponding to above-mentioned embodiments, embodiments of the present disclosure further provide a communication method.

Figure 12:
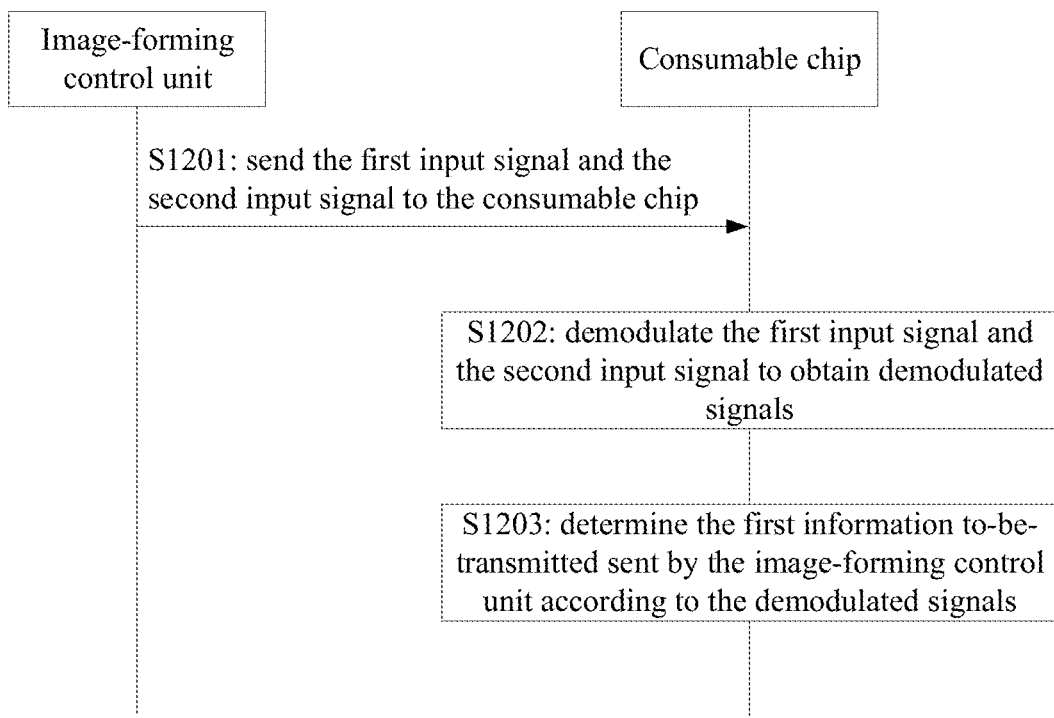
FIG. 12 illustrates a flowchart of a communication method provided by exemplary embodiments of the present disclosure.

Referring to FIG. 12, FIG. 12 illustrates a flowchart of a communication method provided by exemplary embodiments of the present disclosure. The method may be applied to the image-forming control unit and the consumable chip shown in above-mentioned embodiments. The consumable chip may include the substrate; the substrate may be disposed with the first connection terminal and the second connection terminal; the first connection terminal may be connected with the first connection pin of the image-forming control unit which is different from the power supply pin and the ground pin; and the second connection terminal may be connected to the second connection pin on the image-forming control unit which is different from the power supply pin and the ground pin. As shown in FIG. 12, the method may mainly include following exemplary steps.

At S1201, the image-forming control unit may send the first input signal and the second input signal to the consumable chip.

If the image-forming control unit needs to send the first information to-be-transmitted to the consumable chip, the first information to-be-transmitted may be modulated into the first input signal and the second input signal; and the first input signal and the second input signal may be respectively sent to the first connection terminal and the second connection terminal of the consumable chip through the first connection pin and the second connection pin.

At S1202, the consumable chip may demodulate the first input signal and the second input signal to obtain demodulated signals.

After receiving the first input signal and the second input signal, the consumable chip may demodulate the first input signal and the second input signal to obtain demodulated signals. For example, the consumable chip may demodulate the first input signal and the second input signal respectively to obtain digital signals corresponding to the first input signal and the second input signal; or demodulate the first input signal and the second input signal respectively to obtain electrical parameters corresponding to the first input signal and the second input signal.

At S1203, the consumables chip may determine the first information to-be-transmitted sent by the image-forming control unit according to the demodulated signals.

For example, the first input signal may be a data signal, and the second input signal may be a clock signal. According to the data signal and the clock signal, the consumable chip may determine the first information to-be-transmitted sent by the image-forming control unit. At this point, the first information to-be-transmitted may be sent to the consumable chip by the image-forming control unit.

It can be understood that in the communication method shown in FIG. 12, the image-forming control unit may be the sending terminal, and the consumable chip may be the receiving terminal. In practical applications, the consumable chip may also need to send information to the image-forming control unit, that is, the consumable chip may be the sending terminal, and the image-forming control unit may be the receiving terminal. For this application scenario, embodiments of the present disclosure further provide another communication method.

Figure 13:
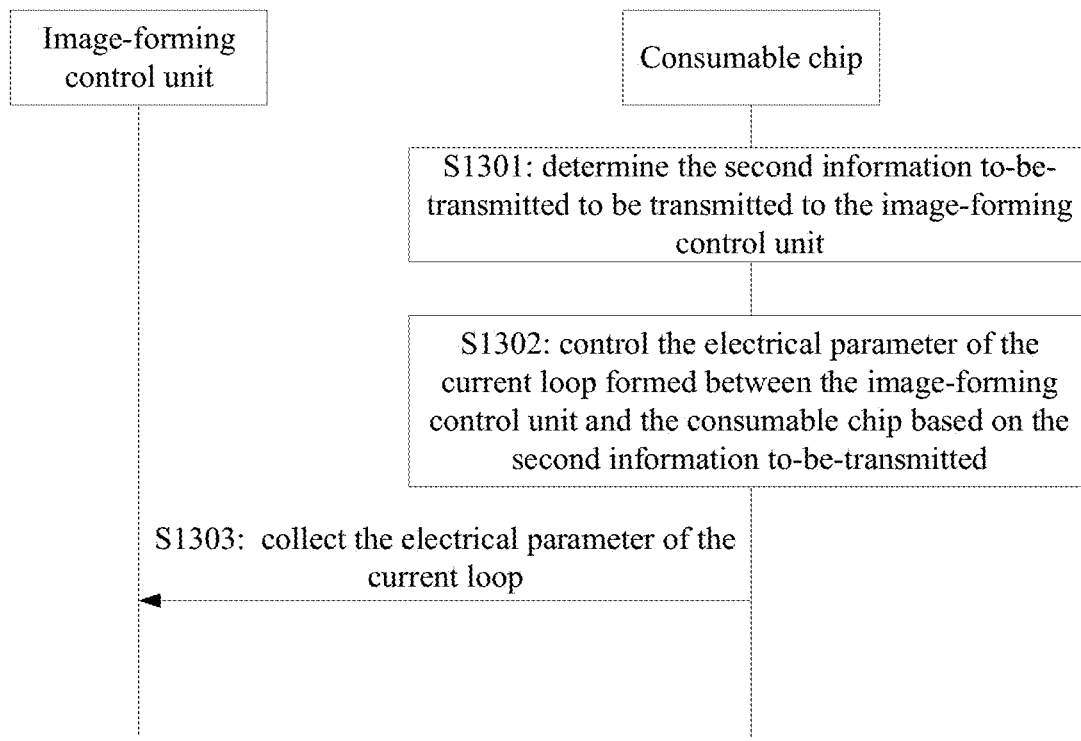
FIG. 13 illustrates a flowchart of another communication method provided by exemplary embodiments of the present disclosure.

Referring FIG. 13, FIG. 13 illustrates a flowchart of another communication method provided by exemplary embodiments of the present disclosure. The method is applied to the image-forming control unit and the consumable chip, where the consumable chip may be the sending terminal, and the image-forming control unit may be the receiving terminal. As shown in FIG. 13, the method may mainly include following exemplary steps.

At S1301, the consumable chip may determine the second information to-be-transmitted which is to be sent to the image-forming control unit.

In practical applications, the second information to-be-transmitted may be the identity authentication information of the consumable chip or the remaining amount of the consumable.

At S1302, the consumable chip may control the electrical parameter of the current loop formed between the image-forming control unit and the consumable chip based on the second information to-be-transmitted.

After determining the second information to-be-transmitted, the consumable chip may modulate the second information to-be-transmitted, that is, to control the electrical parameter of the current loop formed between the image-forming control unit and the consumable chip.

At S1303, the image-forming control unit may collect the electrical parameter of the current loop.

The image-forming control unit may collect the electrical parameter of the current loop, and then may demodulate the second information to-be-transmitted according to the electrical parameter of the current loop. At this point, the second information to-be-transmitted may be sent from the consumable chip to the image-forming control unit.

The working principle of demodulation of the first input signal and the second input signal by the consumable chip and modulation of the second information to-be-transmitted may refer to the description of above-mentioned embodiment of the consumable chip, which may not be described in detail for brevity.

The communication principle between the image-forming control unit and the consumable chip is described hereinafter.

Figure 14:
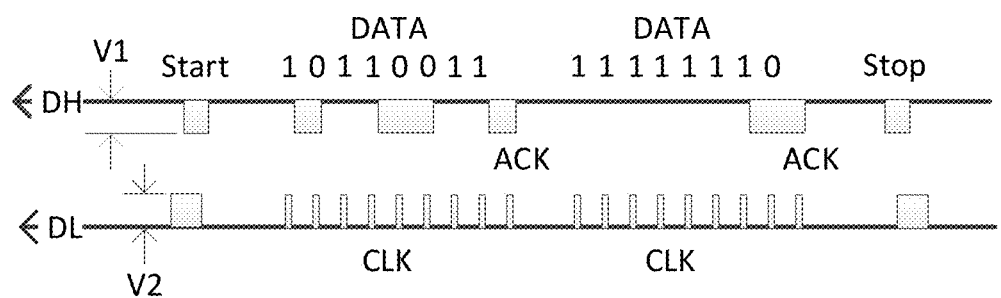
FIG. 14 illustrates a waveform diagram of a data signal and a clock signal provided by exemplary embodiments of the present disclosure.

When the unidirectional conduction element is disposed between the second connection terminal DL and the power supply circuit and when the structure of the consumable chip is shown in FIG. 9, FIG. 14 illustrates a waveform diagram of a data signal and a clock signal provided by exemplary embodiments of the present disclosure. DH refers to the DH signal line, and the DH signal line may be respectively connected with the first connection pin of the image-forming apparatus and the first connection terminal of the consumable chip; and DL refers to the DL signal line, and the DL signal line may be respectively connected to the second connection pin of the image-forming apparatus and the second connection terminal of the consumable chip. DH high-level signal/low-level signal refers to the high-level signal/low-level signal with a voltage amplitude of V1 in the DH signal line; and the DL high-level signal/low-level signal refers to a high-level signal/low-level signal with a voltage amplitude of V2 in the DL signal line.

Taking the circuit diagram shown in FIG. 9 as an example, during the communication process, the DH high-level signal/low-level signal may be inputted to the positive input terminal of the first comparator U1, and the reference voltage generation unit may output the first reference voltage signal that is ½V1 lower than the DH high-level signal, such that the first comparator U1 may output the high/low-level signal with a voltage amplitude between DVCC and DGND, and then send the signal to the input and output terminal of the microcontroller to read the high/low level. The DL high-level signal/low-level signal may be inputted to the positive input terminal of the second comparator U2, and the reference voltage generation unit may output the second reference voltage signal that is ½V2 higher than the DH low-level signal, such that the second comparator U2 may output the high/low-level signal with a voltage amplitude between DVCC and DGND, and then send the signal to the input and output terminal of the microcontroller to read the high/low level.

Since the DH signal line has two situations in which the master sends a signal and the slave responds the signal (the data sending terminal is the master and the data receiving terminal is the slave), there may be a process of control right handover. The specific manner is as follows: the DH signal line may use a resistance pull-up manner, and only when the data sending terminal needs to make the DH signal line to be at a low level, the DH signal line may gain control; and at this point, the DH signal line may be in a low resistance state, so that the DH signal line may have a low level of the voltage amplitude of V1, and the control of the signal line may be released at other times.

In embodiments of the present disclosure, the DH signal line may be configured to transmit data signals, including a Start signal, a DATA signal, an ACK signal, and a Stop signal; and the DL signal line may be configured to transmit a clock signal, that is, a CLK signal, which may be described respectively hereinafter.

For Start signal and Stop signal transmission, when the DL signal line is at a high level, the DH signal line may generate a high-to-low level, such that the Start signal may be established; and when the DL signal line is at a high level, the DH signal line may generate a low-to-high level, such that the Stop signal may be established.

Normally, the communication protocol may specify that the Start signal may start communication and may terminate the communication until the Stop signal, which may be a complete communication frame. If the Start signal appears again when the communication starts and does not be terminated, the frame communication may start with the new Start signal, and previous communication process may be invalid.

For DATA signal transmission, in the communication process, data may be transmitted in units of bits, and one CLK signal cycle may complete the sending and reading of one bit of data.

For sending data, during the falling edge and low-level period of the DL signal, the sending terminal may take over the level control of the DH signal line. At this point, sending 1 may make the DH signal line to be at a high level, and sending 0 may make the DH signal line to be at a low level.

For reading data, during the rising edge and high-level period of the DL signal, the DH signal may be read. At this point, the DH high-level signal may be data 1, and the DH low-level signal may be data 0.

Both the master and the slave may read data and send data.

For transmission of ACK signal, the ACK signal may refer to a communication response signal.

The communication protocol may specify that when the data sending terminal completes the transmission of certain digits according to the communication protocol, the data receiving terminal may send a bit of data 0, which is configured to indicate that some current digits have been received, and next bit data may continue to be sent. If the receiver does not respond data 0, it may indicate that the receiver may no longer respond to the sender.

In an optional implementation manner, when the unidirectional conduction element is not disposed between the second connection terminal DL and the power supply circuit, the superimposed signal corresponding to the first input signal and the second input signal may be obtained on the first connection terminal DH, as shown in FIG. 15.

Furthermore, according to the requirement of the protocol, the DH signal line may be configured to transmit the Start, DATA, ACK and Stop communication signals, and the DL signal line may be configured to transmit the CLK signal. The minimum value of the pulse width corresponding to the DATA signal may be at least twice the maximum value of the pulse width corresponding to the CLK signal. According to above-mentioned description, the superimposed signal corresponding to the first input signal and the second input signal may be obtained on the first connection terminal DH through the signals transmitted on the first connection terminal DH and the second connection terminal DL.

For transmission of Start and Stop signals, when DH is at a low level, DL may generate a low level that satisfies a duration period, such that the Start signal may be established; and when DH is at a low level, DL may generate two low levels that satisfy a duration period, such that the Stop signal may be established.

Normally, the communication protocol may specify that the Start signal may start communication and may terminate the communication until the Stop signal, which may be a complete communication frame. If the Start signal appears again when the communication starts and does not be terminated, the frame communication may start with the new Start signal, and previous communication process may be invalid.

For transmission of DATA signal, in the communication process, data may be transmitted in units of bits, and one CLK cycle may complete the sending and reading of one bit of data.

For sending data, during the falling edge and low level period of DL, the sending terminal may take over the level control of DH. At this point, sending 1 may make DH to be at a high level, and sending 0 may make DH to be at a low level.

For reading data, during the rising edge and high level period of DL, DH may be read. At this point, the high level of DH may be data 1, and the low level of DH may be data 0.

Both master and slave may read data and send data.

For transmission of CK signal, the ACK signal may refer to a communication response signal.

The communication protocol may specify that when the data sending terminal completes the transmission of certain digits according to the communication protocol, the data receiving terminal may send a bit of data 0, which is configured to indicate that some current digits have been received, and next bit data may continue to be sent. If the receiver does not respond data 0, it may indicate that the receiver may no longer respond to the sender.

It should be noted that above communication protocol is only an exemplary description, and the consumable chips and the communication methods provided by various embodiments of the present disclosure may be applicable to different communication protocols, which may not be limited by various embodiments of the present disclosure.

In practical applications, when the consumable chip is installed on the image-forming apparatus, a connector may be used, that is, the first connection pin and the first connection terminal, and the second connection pin and the second connection terminal may be connected through the connector. However, the connector may have contact resistor, and the resistance value of the contact resistor may change with the change of working conditions. When the resistance of the contact resistor increases beyond the set range, it may affect the communication and reduce the reliability of the communication.

Figure 16:
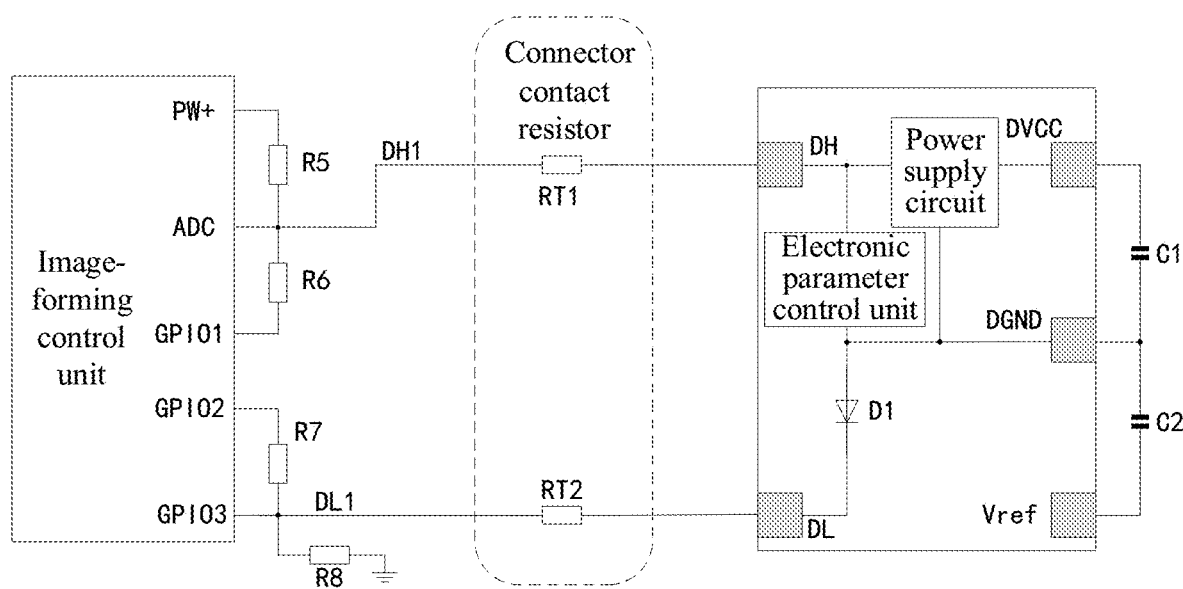
FIG. 16 illustrates a connection circuit diagram of an image-forming control unit and a consumable chip provided by exemplary embodiments of the present disclosure.

Referring to FIG. 16, FIG. 16 illustrates a connection circuit diagram of an image-forming control unit and a consumable chip provided by exemplary embodiments of the present disclosure. Pins PW+, ADC, GPIO1, GPIO2 and GPIO3 are shown in the image-forming control unit, where the pin ADC may be connected to the pin PW+ through the resistor R5, the pin ADC may be connected to the pin GPIO1 through the resistor R6, the pin GPIO3 may be connected to the pin GPIO2 through the resistor R7, and the pin GPIO3 may be grounded through the resistor R8. The connection relationship and working principle of each device and functional unit in the consumable chip may refer to the description of above-mentioned embodiments, which may not be described in detail for brevity.

The pin PW+ may be the power supply pin of the image-forming control unit; the pin ADC may be the first connection pin of the image-forming control unit described in above-mentioned embodiments; and the pin GPIO3 may be the second connection pin of the image-forming control unit described in above-mentioned embodiments. The pin ADC and the pin GPIO3 may be connected to the first connection terminal DH and the second connection terminal DL of the consumable chip through the connector; a contact resistor RT1 may be formed between the pin ADC and the first connection terminal DH; and a contact resistor RT2 may be formed between the pin GPIO3 and the second connection terminal DL. The contact resistor RT1 and the contact resistor RT2 may be the contact resistors of the connector.

In order to ensure that the contact resistor is within the set range to ensure the reliability of communication, in some optional implementation manners, the contact resistor may need to be detected. According to regulation of the communication protocol, the detection of the contact resistor may occur during the power-on period of the image-forming control unit to the consumable chip, or during the periods which are before, during and after the communication of the image-forming control unit with the consumable chip, which may not be limited according to various embodiments of the present disclosure.

In some optional implementation manners, a first electrical parameter of the current loop formed between the consumable chip and the image-forming control unit may be configured; and whether the contact between the consumable chip and the image-forming control unit is desirable may be determined according to the first electrical parameter. For example, a second electrical parameter different from the first electrical parameter of the current loop formed between the consumable chip and the image-forming control unit may be determined according to the first electrical parameter, and whether the contact between the consumable chip and the image-forming control unit is desirable may be determined by combining the second electrical parameter with the first preset range.

In some optional implementation manners, the first electrical parameter may be a current value, the second electrical parameter may be a resistance value, and the first preset range may be a preset resistance value range. For example, in the implementation manner shown in FIG. 16, the current value in the current loop, that is, the first electric parameter, may be configured by the electric parameter control unit in the current loop. In addition, the voltage value in the current loop may be determined according to the voltage outputted by the pin PW+, and then the resistance value in the current loop may be determined according to the voltage value and the current value in the current loop (the total resistance value in the current loop). Since the resistance values of other resistors except the contact resistors RT1+RT2 in the current loop are known, the resistance value of the contact resistors RT1+RT2, that is, the second electrical parameter, may be determined. In order to determine whether the contact between the consumable chip and the image-forming control unit is desirable, the resistance value of the contact resistor RT1+RT2 may be compared with the preset resistance value range. If the resistance value of the contact resistor RT1+RT2 exceeds the preset resistance value range, it is determined that the contact resistor is excessively large, which may affect the communication. At this point, an error may be reported to remind the user. That is, when it is determined that the second electrical parameter is not within the first preset range, the second electrical parameter may be combined with the first preset range to determine that an error may be reported. On the contrary, if the second electrical parameter is within the first preset range, it is determined that the consumable chip and the image-forming control unit can communicate normally.

In some optional implementation manners, a second preset range may also be set within the first preset range, and when the second electrical parameter is within the second preset range, data transmission speed between the image-forming apparatus and the consumable chip may be reduced. Similarly, taking the second electrical parameter as the resistance value of the contact resistor RT1+RT2 as an example, the first preset range may be set as the first preset resistance value range (0, r1), and the second preset range may be set as the second preset resistance value range (r0, r1). When the resistance value of the contact resistor RT1+RT2 is greater than or equal to r1, it indicates that the contact resistor RT1+RT2 is excessively large, which may affect the communication, and an error may be reported at this time. When the resistance value of the contact resistor RT1+RT2 is greater than r0 and less than r1, although the contact resistor RT1+RT2 may meet the communication requirement between the consumable chip and the image-forming control unit, it may not support an excessively high communication rate. At this point, the data transmission speed between the consumable chip and the image-forming control unit may be reduced. When the resistance value of the contact resistor RT1+RT2 is less than or equal to r0, the consumable chip and the image-forming control unit may communicate normally.

In embodiments of the present disclosure, the reliability of the communication between the consumable chip and the image-forming control unit may be ensured by detecting the contact resistor.

It should be noted that when the consumable chip and the image-forming control unit are not connected with a connector, contact resistors may also be between the first connection pin and the first connection terminal, and between the second connection pin and the second connection terminal. Above-mentioned contact state detection method may also be applicable to such application scenario, which may not be limited in various embodiments of the present disclosure.

In some optional implementation manners, above communication method and the contact state detection method may also be combined to improve the reliability of the communication between the consumable chip and the image-forming control unit.

Figure 17:
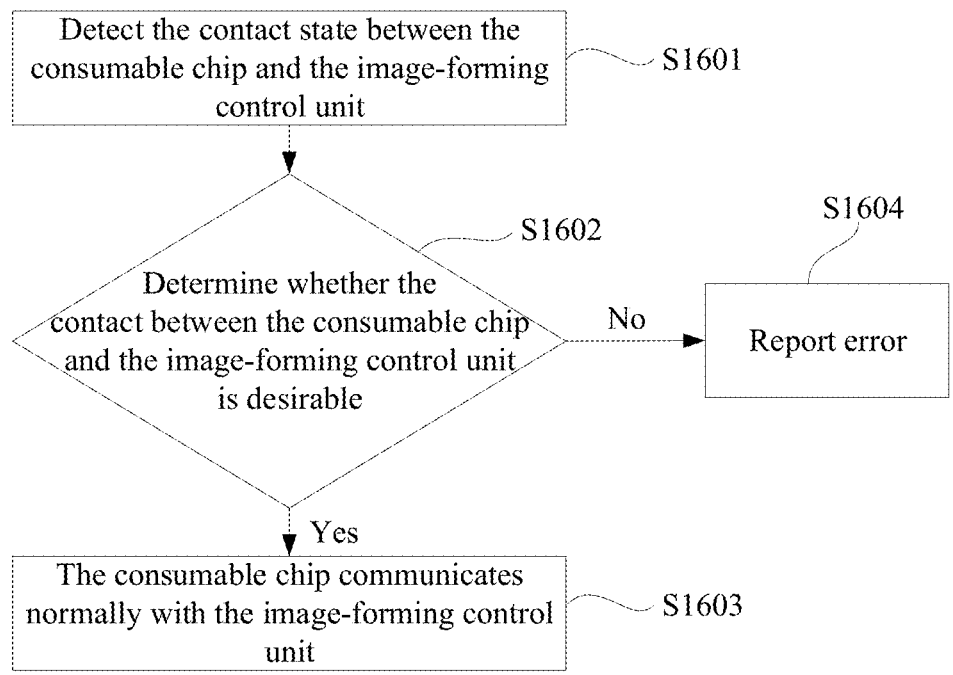
FIG. 17 illustrates a flowchart of another communication method provided by exemplary embodiments of the present disclosure.

In some optional implementation manners, the first electrical parameter may be a current value, the second electrical parameter may be a resistance value, and the first preset range may be a preset resistance value range. The diode D1 in the implementation manner shown in FIG. 16 may be omitted, that is, the electrical parameter configuration unit may be configured to set the resistance value connected between the first connection terminal DH and the second connection terminal DL. Once the resistance value of the connection between DH and DL is known, the voltage value in the current loop may be determined according to the voltage outputted by pin PW+, and then the resistance value in the current loop (the total resistance value in the current loop) may be determined according to the voltage value and the current value in the current loop. Since the resistance values of other resistors except the contact resistors RT1+RT2 in the current loop are known, the resistance value of the contact resistors RT1+RT2, that is, the second electrical parameter, may be determined. In order to determine whether the contact between the consumable chip and the image-forming control unit is desirable, the resistance value of the contact resistor RT1+RT2 may be compared with the preset resistance value range. If the resistance value of the contact resistor RT1+RT2 exceeds the preset resistance value range, it is determined that the contact resistor is excessively large, which may affect the communication. At this point, an error can be reported to remind the user. Referring to FIG. 17, FIG. 17 illustrates a flowchart of another communication method provided by exemplary embodiments of the present disclosure. This method may be applied to the consumable chip described in above-mentioned embodiments, as shown in FIG. 17, which may mainly include following exemplary steps.

At S1601, the contact state between the consumable chip and the image-forming control unit may be detected.

In a specific implementation, the contact state detection method described in above-mentioned embodiments may be configured to detect the contact state between the consumable chip and the image-forming control unit, which may refer to the description of above-mentioned embodiments for details and may not be described in detail herein.

At S1602, whether the contact between the consumable chip and the image-forming control unit is desirable may be determined.

For example, it may be determined whether the contact between the consumable chip and the image-forming control unit is desirable according to the contact state detection result in S1601. If it is determined that the contact between the consumable chip and the image-forming control unit is desirable, proceed step S1603; otherwise, proceed step S1604.

At S1603, the consumable chip may communicate normally with the image-forming control unit.

In embodiments of the present disclosure, if it is determined that the contact between the consumable chip and the image-forming control unit is desirable, the consumable chip and the image-forming control unit may communicate with each other. For example, the method described in any one of various embodiments shown in FIG. 12 and FIG. 13 may be used for communication, which may not be described in detail in various embodiments of the present disclosure.

At S1604, an error may be reported.

If it is determined that there is no desirable contact between the consumable chip and the image-forming control unit, communication may be affected. At this point, an error may be reported to remind the user.

In embodiments of the present disclosure, the communication method and the contact state detection method may be combined to improve the reliability of the communication between the consumable chip and the image-forming control unit.

Corresponding to above-mentioned embodiments, embodiments of the present disclosure also provide a consumable including a housing, a developer accommodating portion, and above-mentioned consumable chip. The developer accommodating portion may be located inside the housing and used for accommodating a developer. The consumable chip may be disposed on the housing.

In one embodiment, the consumable may further include a developer conveying element; and the developer conveying element may be configured to convey the developer.

In one embodiment, the consumable may further include a photosensitive drum and a charging roller; and the charging roller may be configured to charge the photosensitive drum.

Corresponding to above-mentioned embodiments, embodiments of the present disclosure further provide a consumable which includes a photosensitive drum; a charging roller for charging the photosensitive drum; and the consumable chip described in above-mentioned embodiments.

Corresponding to above-mentioned embodiments, embodiments of the present disclosure further provide an image-forming apparatus. The image-forming apparatus may include an image-forming control unit, and the consumable chip described in above-mentioned embodiments.

The image-forming apparatus in embodiments of the present disclosure may be a laser printing apparatus, an ink jet printing apparatus, or the like; and the specific product form thereof may be not limited in embodiments of the present disclosure. For ease of understanding, the structure of an image-forming apparatus is described with reference to accompanying drawings.

Figure 18:
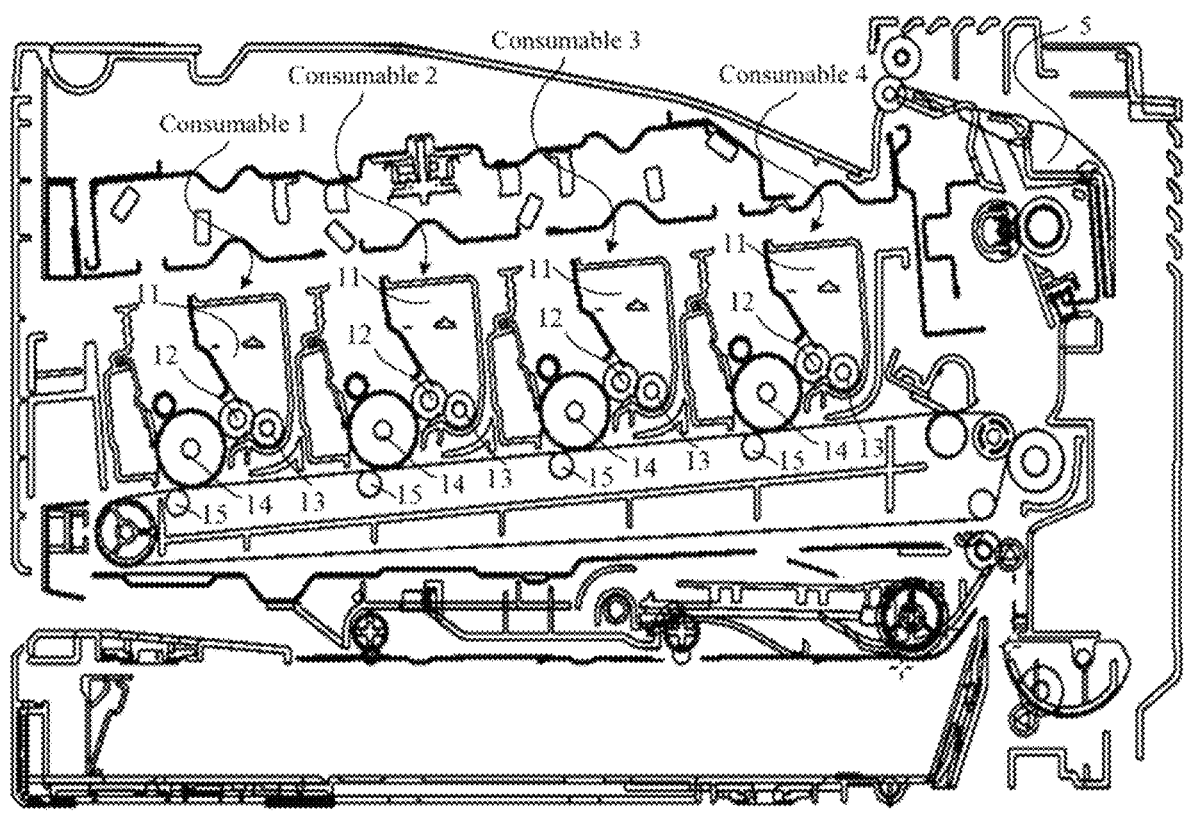
FIG. 18 illustrates a structural schematic of an image-forming apparatus provided by exemplary embodiments of the present disclosure.

FIG. 18 illustrates a structural schematic of an image-forming apparatus provided by exemplary embodiments of the present disclosure. As shown in FIG. 18, as an example of the image-forming apparatus, the image-forming unit of the image-forming apparatus may include a developer accommodating portion 11, a developing element 12, a developer conveying element 13, a photosensitive element 14, a transfer element 15, a fixing assembly 5, and the like. After papers to be printed move along a paper feeding direction and pass through the toner feeding operation of the developer conveying element 13 and the developing operation of the developing element 12 in sequence, the papers to be printed may reach the holding area between the photosensitive element 14 and the transfer element 15 for transferring, and then the papers to be printed may pass the fixing assembly 5 for fixing, thereby completing the image-forming operation. The developer accommodating portion 11 may be configured to accommodate a developer. The developer may be a material including color toner, carbon toner, and the like. The developing element 12 may include elements such as a developing roller and the like. The developer conveying element 13 may include elements such as a toner feeding roller and the like. The photosensitive element 14 may include a photosensitive drum (e.g., organic photoconductor drum (OPC)), a charging roller, and the like, where the charging roller may be configured to charge the photosensitive drum.

Normally, the image-forming apparatus may be detachably installed with at least one consumable. Take the image-forming apparatus shown in FIG. 18 as an example, the image-forming apparatus may be detachably installed with 4 consumables (a consumable 1, a consumable 2, a consumable 3, and a consumable 4 respectively shown in FIG. 18). Four consumables may be configured to provide the image-forming apparatus with developers with four colors including black K, cyan C, magenta M, and yellow Y. Obviously, in other embodiments, the number of consumables installed on the image-forming apparatus may be increased or decreased, for example, 5 or 6 or even more or less, which may not be limited in embodiments of the present disclosure. Various embodiments of the present disclosure are mainly applied to scenarios where the number of consumables installed on the image-forming apparatus is greater than or equal to two.

The consumable chip may be, for example, a circuit substrate installed on the consumable. The circuit substrate may include a storage device and a connection terminal connected to the storage device; and the connection terminal may be used for connecting with a connection pin on the image-forming apparatus side.

For the consumable with the consumable chip installed, in an implementation manner, the consumable may only include the developer accommodating portion 11.

In an implementation manner, the consumable may be a split structure. For example, the consumable (1, 2, 3 or 4) may include mutually detachable developing cartridges and drum cartridges. The developing cartridge may include the housing, the developer accommodating portion 11, the developing member 12 and/or the developer conveying member 13; and the drum cartridge may include the photosensitive member 14, that is, the photosensitive drum and the charging roller.

The developer accommodating portion 11 may be disposed in the housing for accommodating the developer. The developer conveying element 13 may be configured to convey the developer, and the developing element 12 may be configured to convey the developer to the photosensitive drum, where the developer conveying element may be a toner feeding roller or may also be another component such as a toner pushing screw or the like.

In an implementation manner, the consumables may be above-mentioned developing cartridge.

In an implementation manner, the consumable may be above-mentioned drum cartridge.

In an implementation manner, the consumables may be an integrated structure. For example, the consumable (1, 2, 3, or 4) may include the developer accommodating portion 11, the developing member 12, the developer conveying member 13, the photosensitive member 14, and the like.

It should be noted that the consumables mentioned in one embodiment may also be other components, parts, and units in the image-forming apparatus that are easily damaged and need to be replaced, such as paper boxes and the like, which may also belong to the technical solution corresponding to the consumables protected by the present disclosure.

In an implementation, embodiments of the present disclosure further provide a terminal, where the terminal may include one or more processors; a memory; and one or more computer programs. The one or more computer programs may be stored in the memory. The one or more computer programs may include instructions. When being executed by the terminal device, the instructions may cause the terminal to execute some or all of the steps of above-mentioned method embodiments.

In an implementation, the present disclosure further provides a computer storage medium, where the computer storage medium may store a program; and when being executed, the program may include some or all of the steps in various embodiments provided in the present disclosure. The storage medium may be a magnetic disk, an optical disc, a read-only memory (ROM) or a random-access memory (RAM).

In an implementation, embodiments of the present disclosure further provide a computer program product, where the computer program product may include executable instructions; and when being executed on a computer, the executable instructions may enable the computer to execute part or some or all steps of above-mentioned method embodiments.

From above-mentioned embodiments, it may be seen that the solutions provided by the present disclosure may achieve at least following beneficial effects.

In embodiments of the present disclosure, the consumable chip may be connected to the first connection pin and the second connection pin in the image-forming control unit through the first connection terminal and the second connection terminal respectively, that is, the consumable chip may communicate with the image-forming control unit through two signal lines. Only two electrical contact points may need to be set on the consumable chip, which may reduce the number of electrical contacts on the consumable chip and furthermore improve the contact reliability and reduce the area of the consumable chip. In addition, the first connection pin and the second connection pin in the image-forming control unit may be pins different from the power supply pin and the ground pin, that is, two signal lines connecting the image-forming apparatus and the consumable chip may be dedicated signal lines. Compared with signal transmission through the power supply line and the ground line (normally only the modulation and demodulation signals can be transmitted through the power supply line, so that the transmission efficiency between the image-forming control unit and the consumable chip may be low, and the power supply capability may be poor), the communication transmission speed may be faster, and the power supply capability may be desirable through two dedicated signal lines, and consumable chips with higher power consumption may be used.

In some optional implementation manners, two dedicated signal lines may be configured to transmit the data signal and clock signal, respectively; and through mutual cooperation of the data signal and the clock signal, the signal transmitted between the image-forming control unit and the consumable chip may be more stable.

In embodiments of the present disclosure, "at least one" refers to one or more, and "a plurality of" refers to two or more. "And/or" may describe the association relationship of the associated objects, indicating that there can be three types of relationships. For example, A and/or B may indicate the situations where A exists alone, A and B exist at the same time, and B exists alone, where A and B may be singular or plural. The character "/" may normally indicate that associated objects before and after are in an "or" relationship. "The following at least one of" and similar expressions may refer to any combination of these items, including any combination of singular items or plural items. For example, at least one of a, b, and c may represent: a, b, c, a-b, a-c, b-c, or a-b-c, where a, b, and c can be singular or plural.

Those skilled in the art should understand that the units and steps described in embodiments in the present disclosure may be implemented by a combination of electronic hardware, computer software, and electronic hardware. Whether these functions are executed by hardware or software may depend on application and design constraint conditions of the technical solutions. Those skilled in the art may use different methods for each application to implement described functions, but such implementation should not be considered as beyond the scope of the present disclosure.

Those skilled in the art may clearly understand that, for the convenience and conciseness of the description, the working process of the system, apparatus and unit described above may refer to corresponding process in above-mentioned method embodiments, which may not be described in detail herein.

In certain embodiments provided by the present disclosure, if any function is implemented in the form of a software functional unit and sold or used as an independent product, the function can be stored in a computer-readable storage medium. Based on such understanding, the technical solution of the present disclosure may be embodied in the form of a software product in essence, or the part that contributes to the existing technology or the part of the technical solution. The computer software product may be stored in a storage medium and include multiple instructions for causing a computer device (which may be a personal computer, a server, a network device or the like) to execute all or part of the steps of the methods described in various embodiments of the present disclosure.

The above may merely be embodiments of the present disclosure. Changes or substitutions which can be easily thought by those skilled in the art within the technical scope disclosed by the present disclosure should be covered by the protection scope of the present disclosure. The protection scope of the present disclosure shall be subject to the protection scope of the claims.

What is claimed is:

1. A communication method, wherein the method is applied to a consumable chip, the consumable chip is capable of being installed on a consumable, the consumable is capable of being detachably installed on an image-forming apparatus, and the image-forming apparatus includes an image-forming control unit, the method comprising:
receiving a first input signal and a second input signal which are determined based on first information to-be-transmitted and sent by the image-forming control unit through a first connection terminal and a second connection terminal, wherein the consumable chip includes a substrate disposed with the first connection terminal and the second connection terminal; the first connection terminal is connected to a first connection pin of the image-forming apparatus which is different from a power supply pin and a ground pin; and the second connection terminal is connected to a second connection pin on the image-forming apparatus which is different from the power supply pin and the ground pin;
demodulating the first input signal and the second input signal to obtain demodulated signals; and
determining the first information to-be-transmitted sent by the image-forming control unit according to the demodulated signals.

2. The method according to claim 1, wherein demodulating the first input signal and the second input signal to obtain the demodulated signals includes:
demodulating the first input signal and the second input signal respectively to obtain digital signals corresponding to the first input signal and the second input signal; or
demodulating the first input signal and the second input signal respectively to obtain electrical parameters corresponding to the first input signal and the second input signal.

3. The method according to claim 1, further including:
determining second information to-be-transmitted which is sent to the image-forming control unit; and
controlling an electrical parameter of a current loop formed between the image-forming control unit and the consumable chip based on the second information to-be-transmitted.

4. A consumable chip according to claim 1,
wherein the substrate is further disposed with an electronic module electrically connected to the first connection terminal and the second connection terminal; and the electronic module includes a demodulation circuit, and wherein:
the demodulation circuit is configured to demodulate the first input signal and the second input signal to obtain demodulated signals.

5. The consumable chip according to claim 4, wherein:
the demodulation circuit is configured to demodulate the first input signal and the second input signal into digital signals.

6. The consumable chip according to claim 4, wherein: when the consumable is installed on the image-forming apparatus, the demodulation circuit is configured to demodulate the first input signal and the second input signal respectively to obtain electrical parameters corresponding to the first input signal and the second input signal.

7. The consumable chip according to claim 4, wherein when the consumable is installed on the image-forming apparatus, the demodulation circuit includes:
a reference voltage generation unit, configured to generate a plurality of first reference voltage signals and a plurality of second reference voltage signals; and
a comparison circuit unit, configured to compare the first input signal with the plurality of first reference voltage signals respectively to obtain a plurality of first comparison results and/or compare the second input signal with the plurality of second reference voltage signals respectively to obtain a plurality of second comparison results, wherein the plurality of first comparison results is configured to determine an electrical parameter corresponding to the first input signal, and the plurality of second comparison results is configured to determine an electrical parameter corresponding to the second input signal.

8. The consumable chip according to claim 7, wherein:
the comparison circuit unit includes a first comparison circuit unit and a second comparison circuit unit;
a first input terminal of the first comparison circuit unit is connected to the first connection terminal; a second input terminal of the first comparison circuit unit is connected to a first reference voltage output terminal of the reference voltage generation unit; the first reference voltage output terminal is configured to output a first reference voltage, and an output terminal of the first comparison circuit unit is connected to an input and output terminal of the microcontroller; and
a first input terminal of the second comparison circuit unit is connected to the second connection terminal; a second input terminal of the second comparison circuit unit is connected to a second reference voltage output terminal of the reference voltage generation unit; the second reference voltage output terminal is configured to output a second reference voltage; and an output terminal of the second comparison circuit unit is connected to the input and output terminal of the microcontroller.

9. The consumable chip according to claim 4, wherein:
the microcontroller includes a timing unit;
when the consumable is installed on the image-forming apparatus, the demodulation circuit includes:
a reference voltage generation unit, configured to generate a plurality of first reference voltage signals and a plurality of second reference voltage signals; and
a comparison circuit unit, configured to compare a superimposed signal with the plurality of first reference voltage signals respectively to obtain a plurality of first comparison results and compare the superimposed signal with the plurality of second reference voltage signals respectively to obtain a plurality of second comparison results;
the timing unit is configured to perform time width measurement on the plurality of first comparison results respectively to obtain a plurality of measurement results; and
the plurality of first comparison results and the plurality of second comparison results which are combined with the plurality of measurement results are configured to determine an electrical parameter corresponding to the first input signal and an electrical parameter corresponding to the second input signal.

10. The consumable chip according to claim 9, wherein:
the comparison circuit unit includes a first comparison circuit unit and a second comparison circuit unit;
a first input terminal of the first comparison circuit unit is connected to the first connection terminal; a second input terminal of the first comparison circuit unit is connected to a first reference voltage output terminal of the reference voltage generation unit; the first reference voltage output terminal is configured to output a first reference voltage; and an output terminal of the first comparison circuit unit is connected to an input and output terminal of the microcontroller; and
a first input terminal of the second comparison circuit unit is connected to the first connection terminal; a second input terminal of the second comparison circuit unit is connected to a second reference voltage output terminal of the reference voltage generation unit; the second reference voltage output terminal is configured to output a second reference voltage; and an output terminal of the second comparison circuit unit is connected to the input and output terminal of the microcontroller.

11. The consumable chip according to claim 4, wherein:
the modulation circuit includes an electrical parameter control unit; and when the consumable is installed on the image-forming apparatus, the electrical parameter control unit is configured to control an electrical parameter of a current loop formed between the image-forming control unit and the consumable chip.

12. The consumable chip according to claim 11, wherein the electrical parameter control unit includes:
an electrical parameter configuration unit, configured to configure the electrical parameter of the current loop formed between the image-forming control unit and the consumable chip when the consumable is installed on the image-forming apparatus; and
a switch circuit, configured to enable the electrical parameter configuration unit when the switch circuit is in conduction and disable the electrical parameter configuration unit when the switch circuit is in disconnection.

13. The consumable chip according to claim 4, wherein:
the first input signal is a data signal, and the second input signal is a clock signal.

14. A consumable, comprising:
a housing;
a developer accommodating portion in the housing, configured to accommodate a developer; and
the consumable chip according to claim 4.

15. The consumable according to claim 14, further including:
a developer conveying element, configured to convey the developer.

16. The consumable according to claim 15, further including:
a photosensitive drum; and
a charging roller, configured to charge the photosensitive drum.

17. A consumable, comprising:
a photosensitive drum;
a charging roller, configured to charge the photosensitive drum; and
the consumable chip according to claim 4.

18. An image-forming apparatus, comprising:
an image-forming control unit; and
the consumable chip according to claim 4.

19. The consumable chip according to claim 4, wherein:
the electronic module further includes a modulation circuit, wherein:
   the modulation circuit is configured to send modulation signals to the image-forming control unit through the first connection terminal and the second connection terminal.

20. The consumable chip according to claim 4, wherein:
the electronic module further includes a power supply circuit and a microcontroller, wherein:
the power supply circuit is configured to convert the first input signal and the second input signal received through the first connection terminal and the second connection terminal into a DC voltage to supply power to the microcontroller.

\* \* \* \* \*